United States Patent [19]

Blanton et al.

[11] Patent Number: 4,807,158

[45] Date of Patent: Feb. 21, 1989

[54] METHOD AND APPARATUS FOR SAMPLING IMAGES TO SIMULATE MOVEMENT WITHIN A MULTIDIMENSIONAL SPACE

[75] Inventors: Keith A. Blanton, Alpharetta; John E. Tumblin, Decatur, both of Ga.

[73] Assignee: Daleco/Ivex Partners, Ltd., Newport Beach, Calif.

[21] Appl. No.: 913,507

[22] Filed: Sep. 30, 1986

[51] Int. Cl.$^4$ .................................................. G09B 9/08
[52] U.S. Cl. ............................... 364/521; 364/424.01; 434/43; 358/104
[58] Field of Search ............... 364/518, 521, 424, 431; 434/43; 358/104

[56] References Cited

U.S. PATENT DOCUMENTS

| | | |
|---|---|---|
| 3,641,260 | 2/1972 | Herndon . |
| 3,697,678 | 10/1972 | Belleson . |
| 3,742,289 | 6/1973 | Koeijmans . |
| 3,792,442 | 2/1974 | Koeijmans . |
| 3,959,582 | 5/1976 | Law et al. . |
| 4,163,249 | 7/1979 | Michael et al. .................. 358/21 R |
| 4,172,264 | 10/1979 | Taylor et al. ...................... 358/185 |
| 4,179,823 | 12/1979 | Sullivan et al. ................. 364/521 X |
| 4,198,656 | 4/1980 | Mathisen ............................. 358/127 |
| 4,208,719 | 6/1980 | Lotz et al. ....................... 364/521 X |
| 4,208,810 | 6/1980 | Rohner et al. .................. 364/521 X |
| 4,232,456 | 11/1980 | Harmon et al. ......................... 35/25 |
| 4,305,131 | 12/1981 | Best ..................................... 364/521 |
| 4,321,635 | 3/1982 | Tsuyuguchi ....................... 360/72.2 |
| 4,333,152 | 6/1980 | Best ..................................... 364/521 |
| 4,343,037 | 8/1982 | Bolton ................................ 364/521 |
| 4,359,223 | 11/1982 | Baer et al. ......................... 273/85 G |
| 4,359,705 | 11/1982 | Bohn et al. ......................... 335/213 |
| 4,360,876 | 11/1982 | Girault et al. ...................... 364/449 |
| 4,371,343 | 2/1983 | Paris et al. .......................... 434/29 |
| 4,375,091 | 2/1983 | Dakin et al. ......................... 369/32 |
| 4,383,279 | 5/1983 | Kenney, II .......................... 358/341 |
| 4,387,406 | 10/1983 | Ott ...................................... 358/310 |
| 4,395,740 | 7/1983 | Yuen et al. ......................... 360/72.2 |
| 4,449,198 | 5/1984 | Kroon et al. ....................... 364/900 |
| 4,475,132 | 10/1984 | Rodesch ............................ 358/342 |
| 4,533,910 | 8/1985 | Sukonick et al. ............... 364/521 X |
| 4,558,438 | 12/1985 | Jones et al. ........................... 367/71 |
| 4,571,684 | 2/1986 | Takanabe et al. .................. 364/449 |
| 4,580,782 | 4/1986 | Ochi ................................... 273/86 R |
| 4,583,185 | 4/1986 | Heartz ................................. 364/521 |
| 4,615,013 | 9/1986 | Yan et al. ........................... 364/521 |

OTHER PUBLICATIONS

Foley and Van Dam, Chapter 8 of *Fundamentals of Interactive Computer Graphics*, 1982.
Blinn, "Systems Aspects of Computer Image Synthesis and Computer Animation", Notes from course ACM SIGGRAPH 1985, called Image Rendering Tricks.
Blinn, "A Homogenous Formation for Lines in 3 Space", Notes from course ACM SIGGRAPH 1984, called The Mathematics of Computer Graphics.

(List continued on next page.)

Primary Examiner—Gary V. Harkcom
Assistant Examiner—H. R. Herndon
Attorney, Agent, or Firm—Jones, Askew & Lunsford

[57] ABSTRACT

A method and apparatus for simulating movement within a multidimensional space by sampling a prestored panoramic image. The image formed by sampling is displayed on a CRT display screen. Each of the stored images represents the view derived from data stored as a panoramic projection of a flat world in an imaginary space, selected as a function of an observer's position within the imaginary space and orientation with respect to that space. The preferred embodiment selects prestored panoramic image data which has been mapped to a geometric projection surface called a "keypoint". The apparatus includes a random access video disc system for storing the keypoint data. The method involves mapping each pixel on the display screen to the imaginary space and thence to the keypoint projection surface in order to retrieve pixel information for display. Each keypoint projection surface represents an entire 360° panoramic view of the imaginary world for all possible orientations of the observer with respect to the closest keypoint.

91 Claims, 14 Drawing Sheets

OTHER PUBLICATIONS

Blinn, "The Ancient Chinese Art of Chi-Ting", Notes from course ACM SIGGRAPH 1985, called Image Rendering Tricks.
Barr, "Decal Projections", SIGGRAPH 1984 Conference Proceedings.
Dr. Venkat Devarajan & John T. Hooks, Jr., "Low Altitude High Speed Flight Simulation Using Video Disc Technology", LTV Aerospace and Defense Company; date believed to be subsequent to 1983.
J. Robert Lineback, "Flight Simulator Market Soars", *Electronics,* Oct. 6, 1981.
Perrry, Tekla S., "Video Games: the Next Wave", *IEEE Spectrum,* Dec. 1983.
Hashimoto, Yoshitaka, "Digital Decoding and Encoding of the NTSC Signal at 912 Samples per Line", SMPTE Journal, Oct. 1981.
West, Susan, "The New Realism", *Science 84,* Jul./Aug. 1984.
Tucker, Jonathan B., "Computer Graphics Achieves New Realism", *High Technology,* Jun. 1984.
Bergheim, et al., "Lasers Enhance Mass Storage", *InfoWorld,* Jun. 25, 1984.

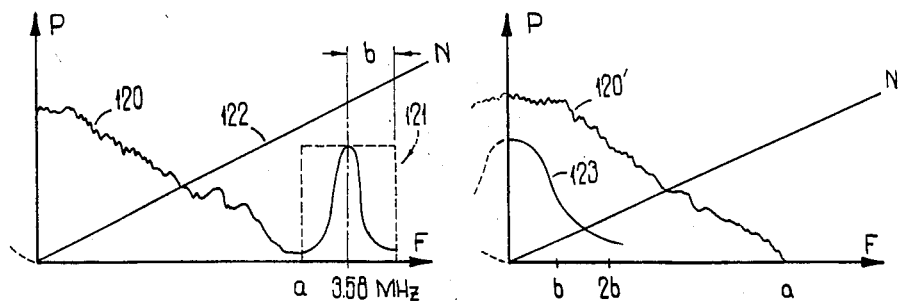
FIG. 11A
PRIOR ART NTSC
FIG. 11B
MULTIPLEXED ANALOG COMPONENTS
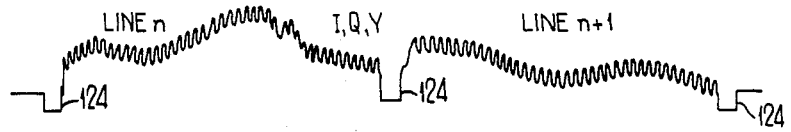
FIG. 12A PRIOR ART NTSC
FIG. 12B MULTIPLEXED ANALOG COMPONENTS
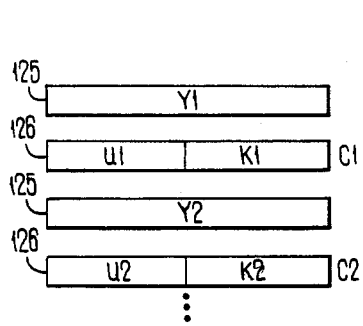
FIG. 12C
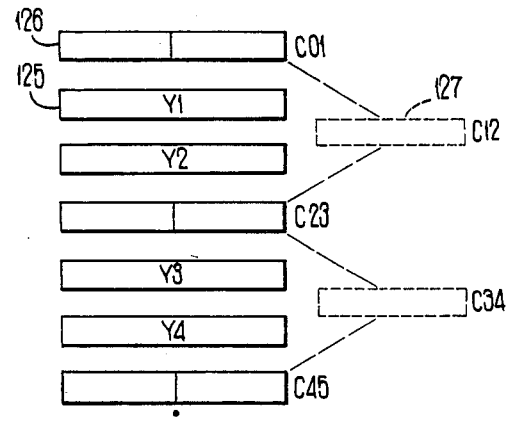
FIG. 12D

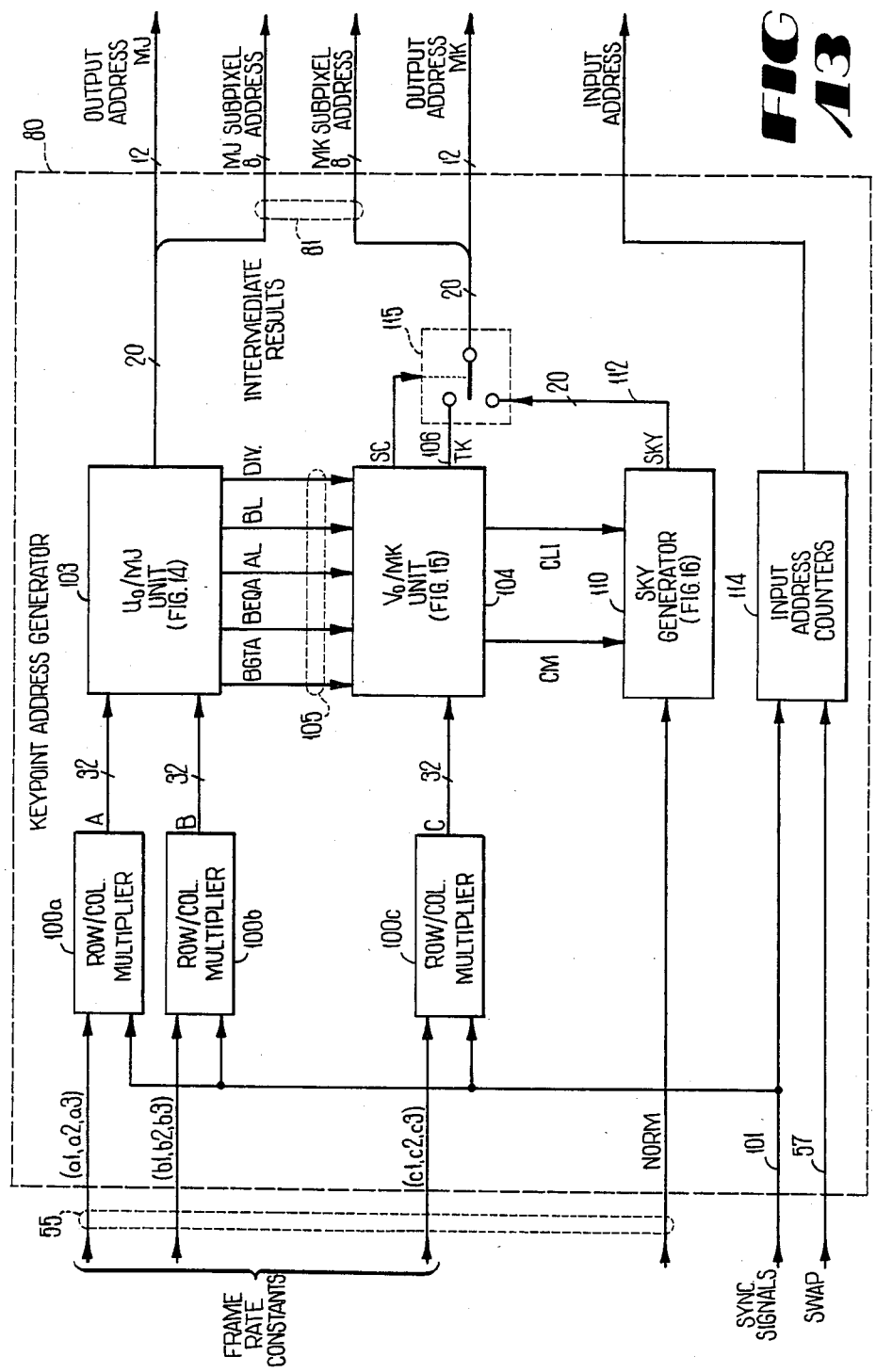

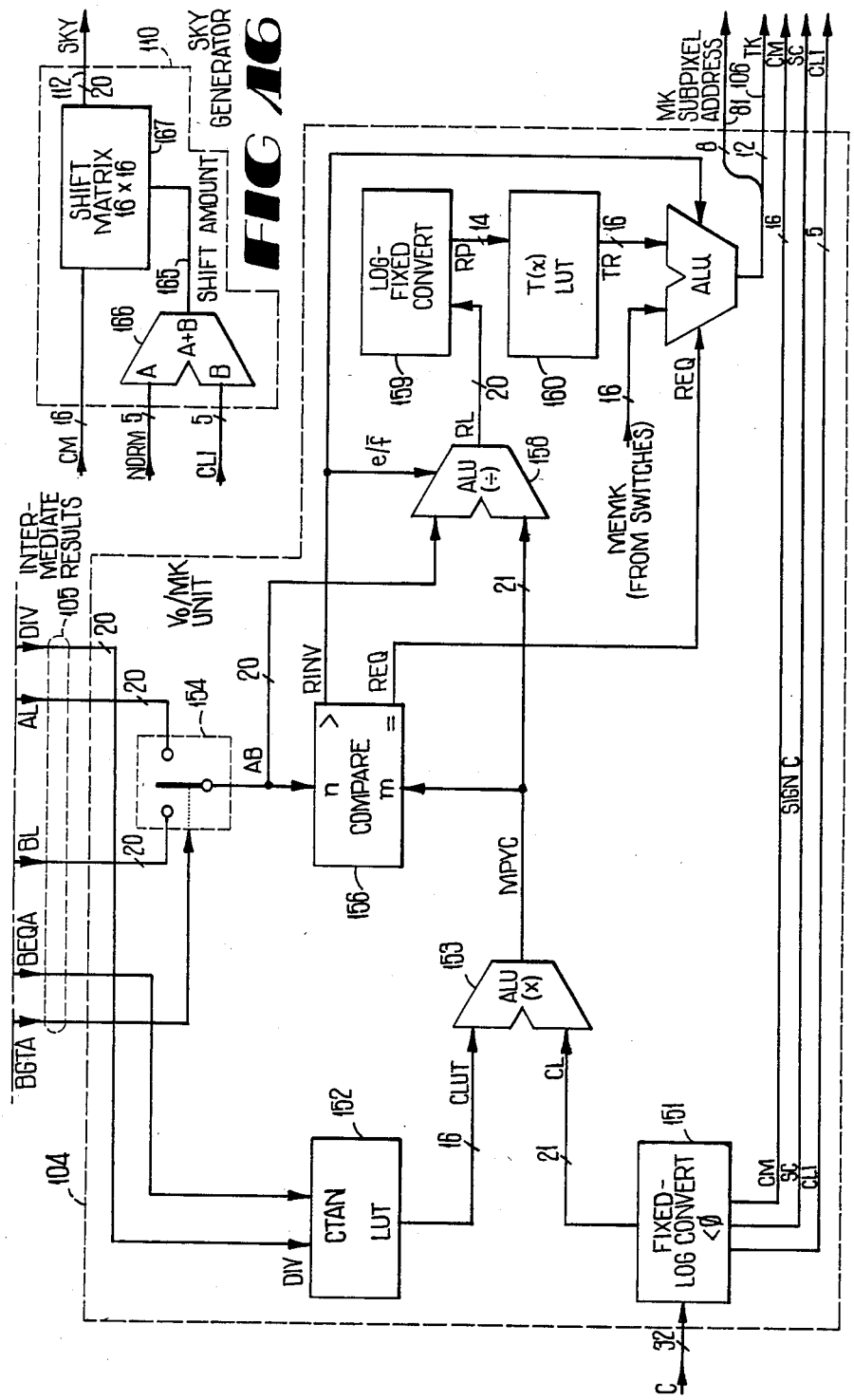

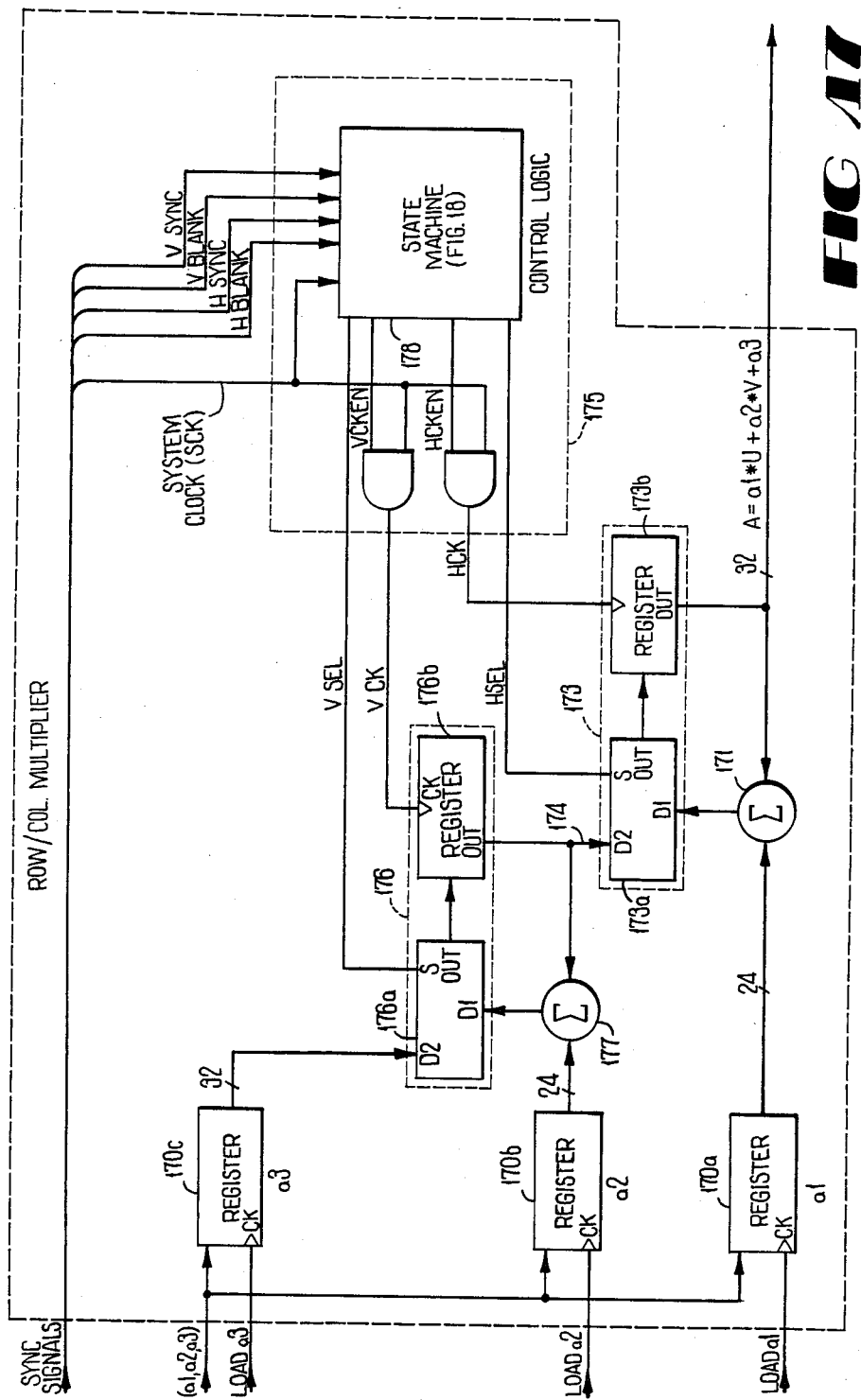

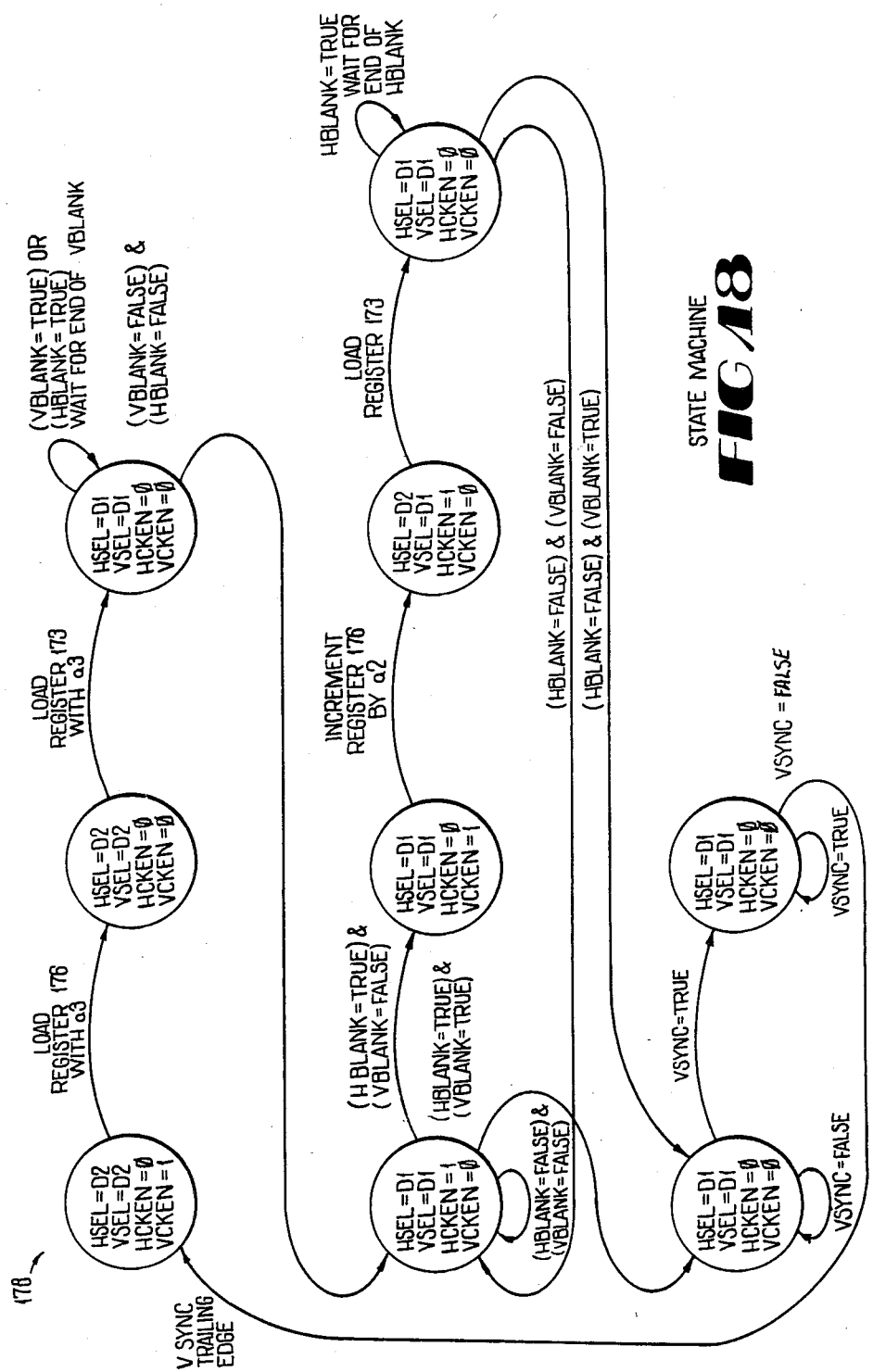

METHOD AND APPARATUS FOR SAMPLING IMAGES TO SIMULATE MOVEMENT WITHIN A MULTIDIMENSIONAL SPACE 1.0 Technical Field
2. Background of the Invention
3.0 Summary of the Invention
4.0 Objects of the Invention
5.0 Brief Description of the Drawing FIGS.
6.0 Detailed Description of the Preferred Embodiment
    6.1 General Overview of Methodology
        6.1.1 Keypoint Projection Surface Mapping
        6.1.2 Keypoint Image Creation
        6.1.3 Keypoint Layout and Selection
    6.2 Equations Implemented in the Preferred Embodiment
        6.2.1 Definition of Variables
        6.2.2 Frame Rate Constants
        6.2.3 Output Memory Address Equations MJ, MK
        6.2.4 Haze Approximation
        6.2.5 Antialiasing
        6.2.6 Hardware Data Type Converters
    6.3 Schematic Diagrams of the Preferred Embodiment
        6.3.1 Processing Unit
        6.3.2 Calculation Unit
        6.3.3 Keypoint Address Generator
            6.3.3.1 $U_0$/MJ Unit
            6.3.3.2 $V_0$/MK Unit
            6.3.3.3 Sky Generator Circuit
        6.3.4 Row/Column Multiplier Circuit
        6.3.5 Haze Overlay Circuit
    6.4 Data Precision Considerations
    6.5 Multiplexed Analog Component Encoding
7.0 Claims

1.0 TECHNICAL FIELD

The present invention relates generally to visual systems for vehicle flight simulation, and more particularly relates to a method and apparatus for simulating freedom of movement with in a multidimensional space by sampling image data from a panoramic image projection stored on a random access storage media such as a video disc, particularly useful for incorporation in a flight simulator.

2.0 BACKGROUND OF THE INVENTION

High costs of aircraft operation and desires on the part of governmental agencies to efficiently and effectively train aircraft pilots have resulted in efforts to develop cost effective flight simulator apparatus. The United States Federal Aviation Administration has recently implemented an advanced flight simulation program requiring that flight simulators accurately depict an aircraft's performance on take-off and landing maneuvers as well as on the ground, provide an improved visual response time and increased fields of vision, and provide daylight capabilities plus adverse weather features to allow pilots to upgrade from copilot to captain on the same aircraft or to laterally transfer crew members from one aircraft type to another entirely in a simulator.

With operating costs of large jet liners such as a Boeing 747 running $6,500 to $7,000 per hour, commercial carriers and the military alike are interested in lower cost flight simulators for providing total simulation training. Flight simulation apparatus employing high-speed supercomputers and superminicomputers to create graphics displays in real time have been developed in response to this need. Costs of many current flight simulation apparatus are around $250–300 per hour due to the high computational cost of generating real-time images for the flight simulators which can be reproduced rapidly enough to be convincingly realistic. Costs of this order, however, are prohibitive for smaller commercial and private carriers and private pilots, who must still rely upon actual flight time for training and upgrading. Moreover, the resolution of the graphics displays of many of these systems leaves much to be desired when the computer-generated images are created at rates high enough to avoid perceptible flicker. Accordingly, there is a need for a means of producing convincingly realistic images for flight simulators at drastically reduced costs which do not involve the real-time generation of sophisticated realistic computer graphics by supercomputers and superminicomputers.

Recent advances in generating realistic graphic images by computer have made it desirable to incorporate these new techniques into flight simulation. Although costs of the computers and software for generating realistic computer images are falling rapidly, the computational demands of realistic image creation are immense. Typically, supercomputers such as a Cray X-MP Super Computer, manufactured by Cray Research, can perform over 400 million mathematical computations per second, but even such a supercomputer can produce only around 25 minutes of high quality 70-millimeter computer-generated film images per month. Fast minicomputers can produce an average of only about 2.5 minutes of 70-millimeter film images per year. While it is desirable to use newer image synthesis techniques such as fractal geometry for generating images for flight simulation and other applications such as games, it is presently difficult if not impossible to generate and display such images in real time. Accordingly, there is a need for a method of creating highly realistic images off-line, and providing for storage and retrieval of previously-generated images for applications such as flight simulators.

One prior art technique for generating images for use in simulators is known as texture mapping. This technique has been successfully employed by the Jet Propulsion Laboratory (JPL), Pasadena, Calif., to generate simulated images for the planning stages of the Voyager spacecraft in its recent fly-by of the planet Jupiter. Two-dimensional images from paintings and photographs were remapped to a sphere so that various planet fly-by scenarios could be simulated for the space vehicle.

In a texture mapping system, an image that is projected on one surface is remapped to a different surface by ray tracing. For example, one surface which represents the terrain that is to be simulated may be a plane, like an overhead map or satellite photograph. This first surface is remapped to some other surface; this may only involve remapping to another plane to effect perspective transformation. The other plane could be a CRT display screen in a vehicle simulator—the data from the stored representation of the terrain in the image data base is mapped to the plane of the screen which is in the simulator. As another example, for the JPL Jupiter simulation, and in many recent popular science fiction movies, there is a mapping to a spherical representation to simulate a spinning globe of a planet. Of course, these are non-real-time simulations.

There are several problems encountered in texture mapping approaches to simulation which make it expensive for real-time simulation. One significant problem is that computations can be very complicated and therefore computationally expensive. Another major complication involves sampling artifacts or aliasing, especially on complicated surfaces such as remapping from a plane to a sphere. One aspect of the problem results from uneven resolutions between the mapped surface and the mapping surface. Some areas may have a high resolution on the original surface while other areas have very coarse resolution. For example, consider the remapping of a regular Mercator projection map to a globe—on the Mercator projection the data at poles has a very high resolution. When the data is mapped to the globe's surface, all the data gets condensed. When this is done pixel-by-pixel, as in a digital imaging system, some of this condensed data may be skipped over and cause the effect often called "aliasing" or "sparkling". In the case of moving sequences in particular, there can be irregular edges or possibly holes in the images. Other effects of texture mapping include the situation where the original resolution was insufficient (such as on the equator) and the data at certain regions (on the equator) becomes coarse or blocky when remapped because the pixels are becoming very large relative to the new projection surface. In real-time simulators, aliasing is unacceptable because it severely degrades the realism of the simulated images.

3.0 SUMMARY OF THE INVENTION

The present invention provides a solution to the aforementioned problems in real-time image generation for flight simulation. Unlike conventional visual simulator systems which often are high-speed polygon drawing engines, the present invention is based on image extrapolation or sampling techniques. True six-degree-of-freedom movement is permitted over a flat terrain having extremely high quality texturing and detail. The preferred embodiment of the present invention uses a video disc for mass storage, and is capable of representing a 50 mile by 50 mile unique imaginary space, from zero to 100,000 feet in altitude. Images are presented at a 30 Hertz (Hz) rate, and the cost of the system is extremely low when compared to conventional visual systems.

For a typical flight simulator data base as may be represented in the preferred embodiment, an operational runway 10,000 feet in length, including markings and other airfield features, can be represented with a sub-inch resolution. The image data base "wraps around" smoothly at the edges, preventing the phenomenon known as "edge of the world" present in some types of prior art systems. Photography of real terrain can be used as input to the image data base creation process. Advantageously, extremely high resolution computer graphics representing the imaginary landscape may be generated off-line, obviating real-time image generation, yet still providing extremely convincing and realistic image sequences.

Briefly described, the present invention is an interactive image reproducing apparatus which generates a sequence of images on a CRT to simulate movement within a multidimensional space. The preferred embodiment carries out a method of storing a number of high resolution panoramic images on a storage medium, and retrieving and extrapolating or sampling a portion of a panoramic image as a function of an observer's location and orientation within an imaginary space. A randomly addressable data storage means, such as a video disc, is employed as the storage medium in the disclosed embodiment. The data storage means allows high-speed selectable retrieval of a plurality of panoramic images in addressable locations.

Each of the stored panoramic images is created off line by separate computer graphic image generation equipment or photographically, and contains all data required to reconstruct all possible views of an imaginary landscape. The stored panoramic images are then associated with a "keypoint", which is defined as a predetermined location within an imaginary multidimensional space.

A "view" of the imaginary space is generated as a function of the location and attitude of an "eyepoint" within the imaginary space. The view corresponds to the field of view of an observer located at that eyepoint. A particular view associated with a particular eyepoint has three spatial coordinates and three angular coordinates, that is, a location within the imaginary space and attitude angles.

Control means are provided for addressing the data storage means as a function of observer location (i.e., the eyepoint location) and orientation (i.e., roll, tilt, and pan). In response, the data storage means provides a retrieved set of data, called the "keypoint data", which corresponds to the entire panoramic view associated with a keypoint selected by the control means. Image extrapolating or sampling means responsive to the observer location and orientation provides as an output only a sampled portion or subset of the selected panoramic image of a keypoint.

In accordance with the invention, only a single panoramic image is used to display any particular view as the eyepoint moves through the imaginary space, until the movement indicates that a different stored panoramic image associated with a different keypoint should be retrieved and displayed.

More particularly described, the present invention provides a visual image reproduction system which communicates with a host simulator through a master controller. The controller is responsive to input information from the simulator such as the location and orientation of the eyepoint within the imaginary space, and determines which keypoint is associated with the given eyepoint. The keypoint data is then retrieved from the video disc. The video disc is merely used as a high capacity data storage device, rather than as an output image playback device. Data are retrieved from the video disc and stored in a keypoint data memory, which is addressable by a keypoint address generator/calculator to access the data. A sky generator is operable for portions of the image above the horizon. Distance-based haze is blended with the composite image, permitting selectable visibility. The data determined by the keypoint address generator, which comprise picture elements (pixels) of color component information, are then converted to an RGB video format for display on a CRT. The displayed image is obtained pixel-by-pixel and displayed in a raster scan fashion.

A large number of panoramic views called "keypoints" comprise the data stored on the video disc. The keypoints are arranged so that their density within the imaginary space is greater in regions of special interest, for example regions surrounding the airport or runway or the like for flight simulation. The keypoint image data comprises a distorted panoramic image consisting of a plurality of pixels. Each of these keypoint images includes all data required for creating all possible views seen by an observer (such as a pilot in a flight simulator) moving from a first point within the imaginary space to another, second point, where the path between the first and second points is in the subspace associated with that keypoint. Each keypoint data set, being an entire 360° panorama, can be used to create a plurality of video images.

In the preferred embodiment, the keypoint may be considered as a geometric mapping surface upon which the landscape features of a flat earth are projected or mapped. Thus, associated with each keypoint is a panoramic image, which comprises a plurality of picture elements which are "mapped" onto a predetermined imaginary geometric surface. The imaginary geometric surface is selected during the system design based on a variety of factors such as computational ease. The panoramic images are formed off-line by mapping each point on an imaginary flat world landscape onto the preselected geometric mapping surface, by extending a ray from the keypoint through the mapping surface to the flat world landscape, and storing as a picture element the color value of the picture element associated with the ray at an address associated with the geometric configuration of the mapping surface.

The keypoint layout within the imaginary space in the preferred embodiment comprises several planes of keypoints. The density of the keypoints progressively decreases with increasing altitude. The layout of keypoints within the imaginary space partitions the imaginary space so that every possible position and observer orientation within the imaginary space is associated with a single keypoint. Using the position and attitude of the viewing screen of the observer, a unique keypoint is selected for retrieval from the video disc. A mathematical address function is defined which relates the viewing screen and the observer with the coordinates of the keypoint, and in particular with the surface of the keypoint projection or mapping surface.

To produce an image, the viewing screen is raster scanned. First, the intersection of the imaginary ground with a ray from the eyepoint through the viewing screen is determined. Next, the intersection of the keypoint projection or mapping surface is determined by extending a line from the determined point on the imaginary ground to the keypoint position. This intersection uniquely defines a point on the keypoint projection surface. This unique point causes the selection of the four closest keypoint image pixels for use b y an antialiasing circuit. It will be noted that the values necessary to determine the distance from the eyepoint to the point on the imaginary ground are computed at this step, which is then used to add haze to the resulting images to allow variable visibility.

By raster scanning the viewing screen surface by repeatedly determining the point of intersection on the ground and the resulting point on the keypoint projection surface, an image is created pixel-by-pixel. The extrapolation or sampling process always takes the same amount of time for each pixel. Accordingly, the frame update rate and visual system latency time remain constant. An update of a new frame involves redefining the address computation parameters.

Keypoint data are stored on a video disc because of its large capacity, rapid access, and low cost. In the preferred embodiment, a conventional video disc player is employed and modified to increase its track jumping speed and accuracy. Since a new keypoint must be retrieved from the video disc when the eyepoint moves too far away from the current keypoint in imaginary space, the video disc system need not be capable of retrieving a random keypoint within the image data base within one frame time. Rather, the system need only be able to load new keypoint data into the keypoint data memory by the time the eyepoint has moved to a location in imaginary space where it is needed. Accordingly, it will be appreciated that double buffering techniques are employed to allow ample time for determining and retrieving the new keypoint based on input information from the host simulator. By anticipating the trajectory of the eyepoint, the next keypoint data is loaded into one of the keypoint buffers while the data in the other buffer are being employed to generate the image.

The maximum eyepoint speed within the imaginary space increases with altitude, since the keypoint spacing is greater at higher altitudes. However, even for low altitudes, the speed limit provides realistic flight simulation. In the preferred embodiment, the eyepoint can always travel at least 100 mph, and can exceed 3,000 mph at altitudes exceeding 250 feet.

Typical displayed scenes possible in the preferred embodiment contain as many as 1,000,000 polygons, compared to the best currently-available real-time image generating systems whose maximum reliable real-time capability is in the range of 4,000–5,000 polygons per frame. Accordingly, it will be appreciated that the present invention provides a method and apparatus for reproducing highly detailed renderings of objects and accurate texturing of terrain and other features. Runway markings and landscape texturing built into the image data base create excellent depth perception and closure cues. A plurality of systems constructed in accordance with the preferred embodiment may be connected in a modular fashion, permitting larger imaginary spaces and the insertion of independently controlled moving objects for targets and the like.

4.0 OBJECTS OF THE INVENTION

Accordingly, it is an object of the present invention to provide an improved and low-cost flight simulator apparatus.

It is another object of the present invention to provide an image reproducing apparatus which allows reproduction of sequences of images without objectionable transition between sequences.

It is another object of the present invention to provide an image reproducing apparatus which provides extremely high quality and detailed visual images at a sufficiently rapid rate to prevent objectionable transition between images.

It is another object of the present invention to provide an improved flight simulator which employs highly realistic landscape scenes to create a true sense of motion, distance and altitude.

It is another object of the p resent invention to. provide an imaging apparatus which employs commercially available low-cost mass storage media for image storage coupled with real-time sampling or extrapolation rather than real-time image generation.

It is another object of the present invention to provide a low cost flight simulator wherein high resolution computer graphics representing an imaginary space may be generated off line, stored, and accessed in real time to create realistic and convincing movement sequences.

It is another object of the p resent invention to provide a movement simulator wherein all data required for representing a plurality of different views is accessed in a single data loading operation for a high speed random access memory, thereby allowing all data needed to generate a plurality of given scenes to be accessed at high speed.

It is another object of the present invention to provide an improved movement simulator which employs image extrapolation techniques to generate images.

It is another object of the present invention to provide a movement simulator which stores image data at lower resolution for areas of the scene at greater apparent distance and higher resolution for areas of the scene at closer apparent distance, thereby conserving data storage requirements.

It is another object of the present invention to provide an improved image reproducing apparatus which allows simulation of freedom of movement in a multidimensional space by reproducing images in greater detail at lower apparent altitudes than at higher apparent altitudes, in order to conserve data storage requirements.

These and other objects, features, and advantages of the present invention may be more clearly understood and appreciated from a review of the following detailed description of the preferred embodiment when taken in conjunction with the appended drawings and claims.

5.0 BRIEF DESCRIPTION OF THE DRAWING FIGURES

FIG. 1 graphically illustrates the mapping of a panoramic flat world onto a keypoint mapping surface used in the preferred embodiment.

FIG. 2 illustrates the location of keypoints within an imaginary space for a typical exemplary data base.

FIG. 3 graphically illustrates a planar view of an imaginary flat world and the layout of keypoints within such space.

FIG. 4 graphically illustrates the coordinates of the eyepoint, screen, and keypoint relative to the ground in the imaginary space represented by the keypoint data.

FIGS. 5, 6, and 7 illustrate certain variables associated with the eyepoint and viewing screen.

FIG. 11, consisting of FIGS. 11A and 11B, illustrates the noise spectra of conventional video encoding and the image encoding technique for data storage on the video disc employed in the preferred embodiment.

FIG. 12, consisting of FIGS. 12A-12D, illustrates a conventional NTSC encoded video signal and a signal representing multiplexed analog components for data storage on the video disc employed in the preferred embodiment.

Figure 10:
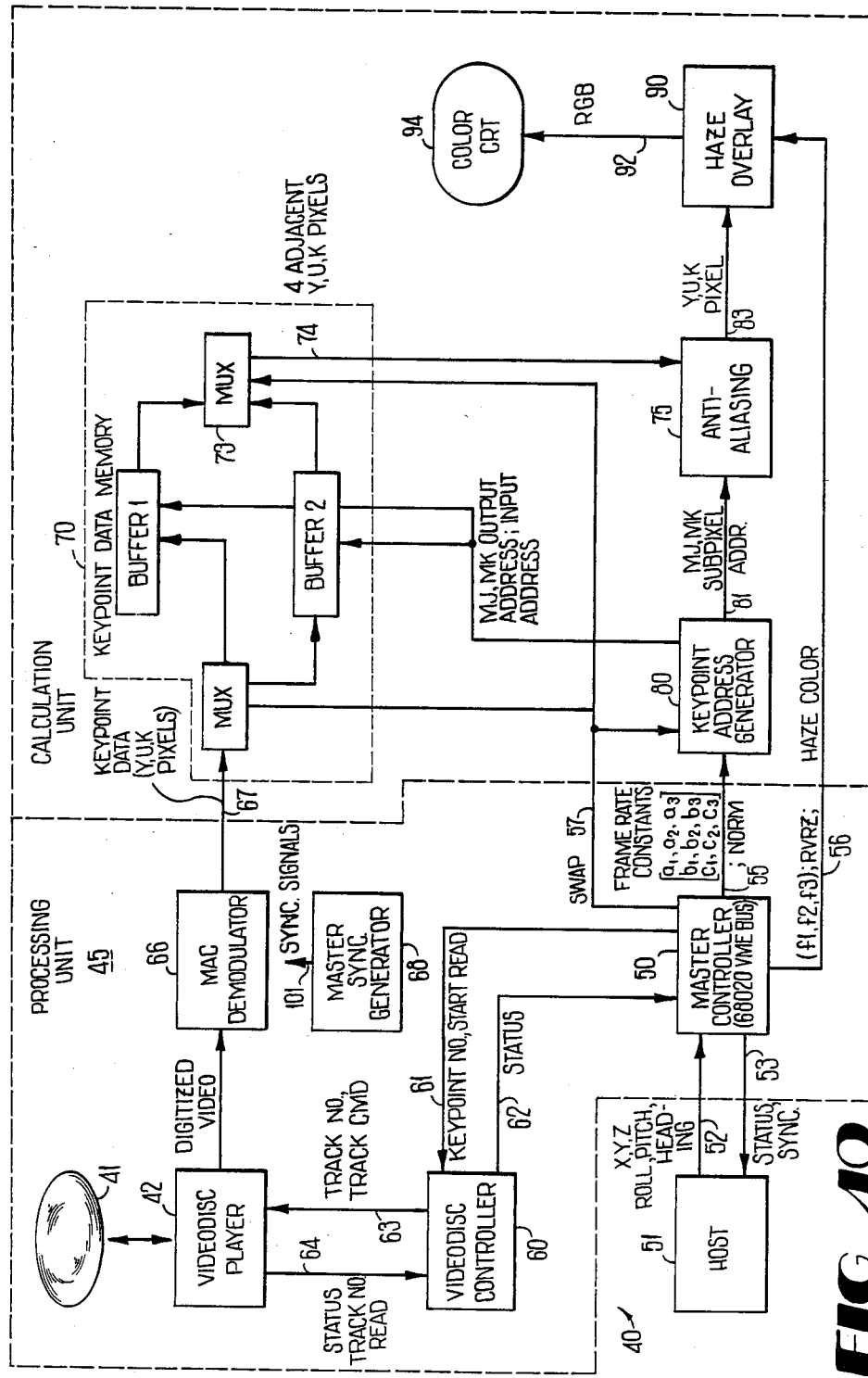
FIG. 10 is a block schematic diagram of the preferred embodiment of apparatus for reproducing images to simulate movement within a multidimensional space in accordance with the present invention.

FIG. 13 is a detailed block schematic diagram of the keypoint address generator employed in the preferred embodiment of FIG. 10.

Figure 14:
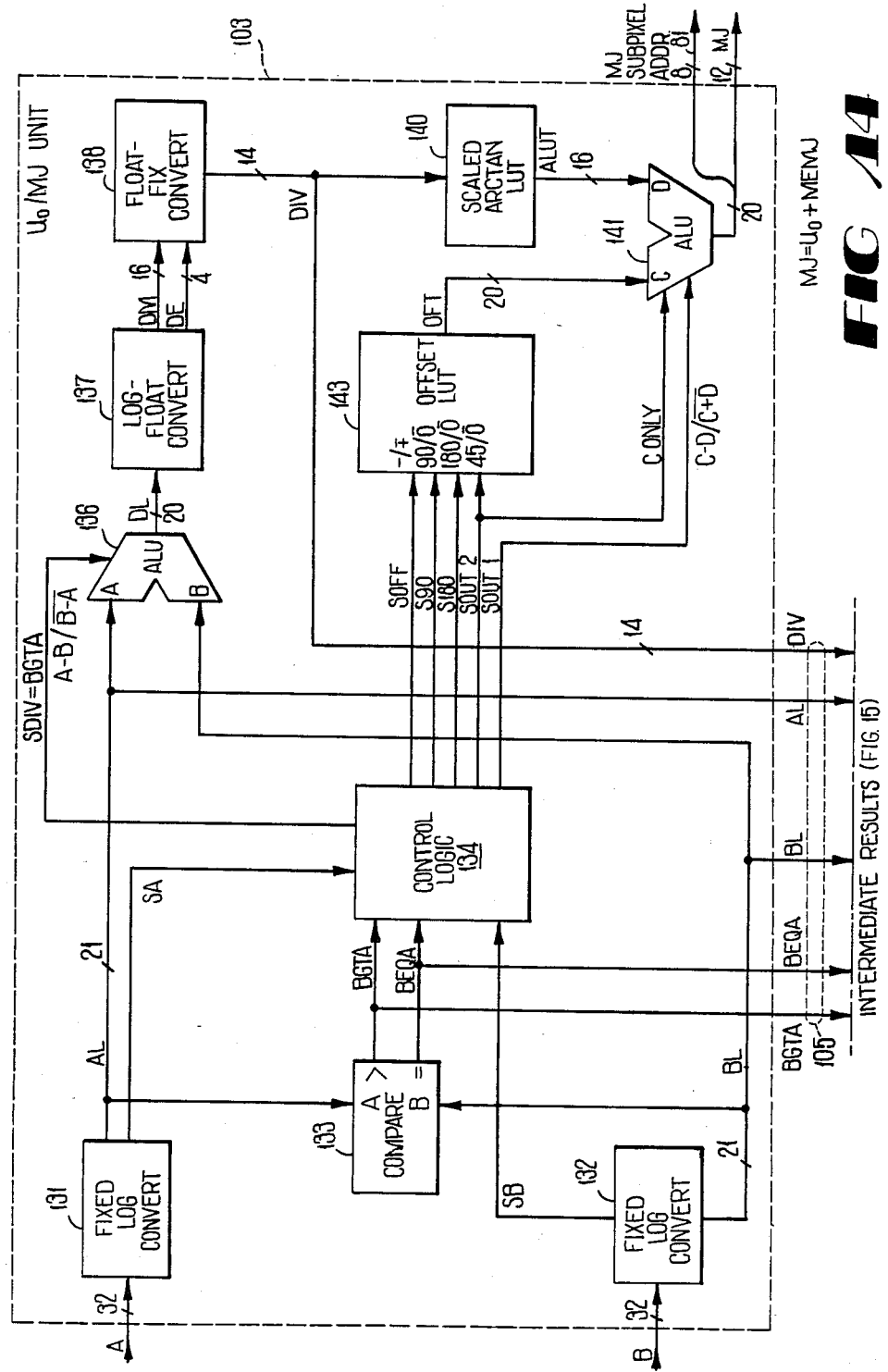

FIG. 14 is a detailed block schematic diagram of the $U_0$/MJ address calculation unit employed in the keypoint address generator of FIG. 13.

FIG. 15 is a detailed schematic diagram of the $V_0$/MK address calculation unit employed in the keypoint address generator of FIG. 13.

FIG. 16 is a detailed block schematic diagram of the sky generator employed in the keypoint address generator of FIG. 13.

FIG. 17 is a detailed block schematic diagram of the row/column multiplier circuit employed in the preferred embodiment.

FIG. 18 is a state diagram of the sequential control logic in the row/column multiplier of FIG. 17.

Figure 19:
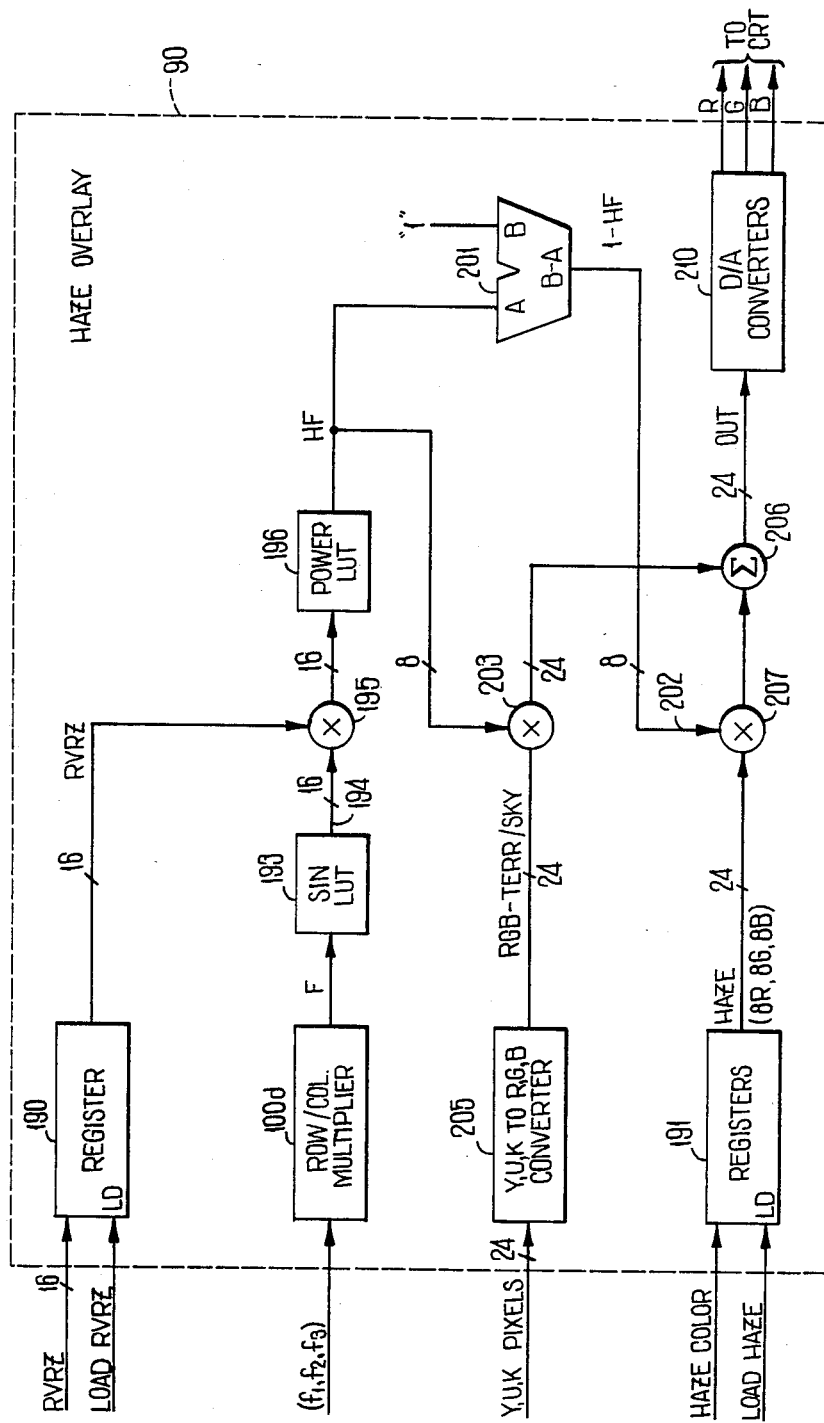

FIG. 19 is a detailed block schematic diagram of the haze overlay circuit employed in the preferred embodiment illustrated in FIG. 10.

Figure 20:
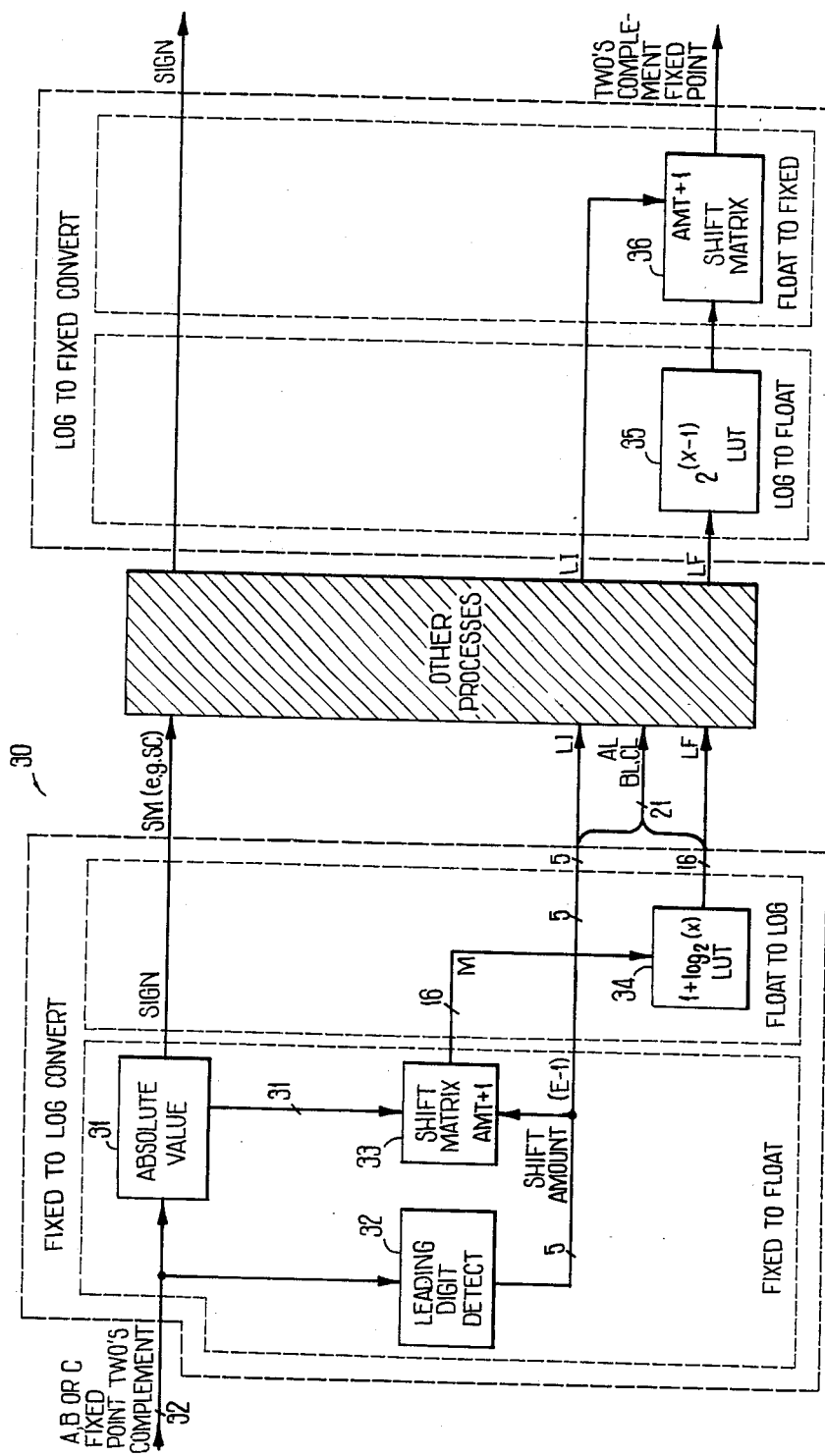

FIG. 20 illustrates converters for hardware data types employed in the preferred embodiment.

6.0 DETAILED DESCRIPTION OF THE PREFERRED EMBODIMENT

The preferred embodiment of the present invention, illustrated in the several figures, is an apparatus which carries out a method and apparatus for simulating freedom of movement with in a multidimensional imaginary space, utilizing a visual display, and is particularly useful for commercial and military flight and/or vehicle/-travel simulation. The effect of movement within the imaginary space is created by selecting a particular keypoint and displaying a predetermined set of data associated with the selected keypoint to create a sequence of images which would be seen by an observer at an infinite number of predetermined locations within the imaginary space. This set of predetermined locations defines a subspace within the original imaginary space. The selection of one of a number of selectable keypoints is made in response to operator input indicative of the hypothetical "location" of an observer within the imaginary space, and the orientation of the observer such as roll, tilt, and pan, as well as the trajectory of the observer eyepoint within the imaginary space. The operator's choices, such as provided by operator controls such as a joystick or the like, are manifested by choosing a particular keypoint from a set of possible choices of keypoints, and presenting a sequence of images to the operator which coincide with the control exercised by the operator.

6.1 GENERAL OVERVIEW OF METHODOLOGY

6.1.1 KEYPOINT PROJECTION SURFACE MAPPING

Figure 1:
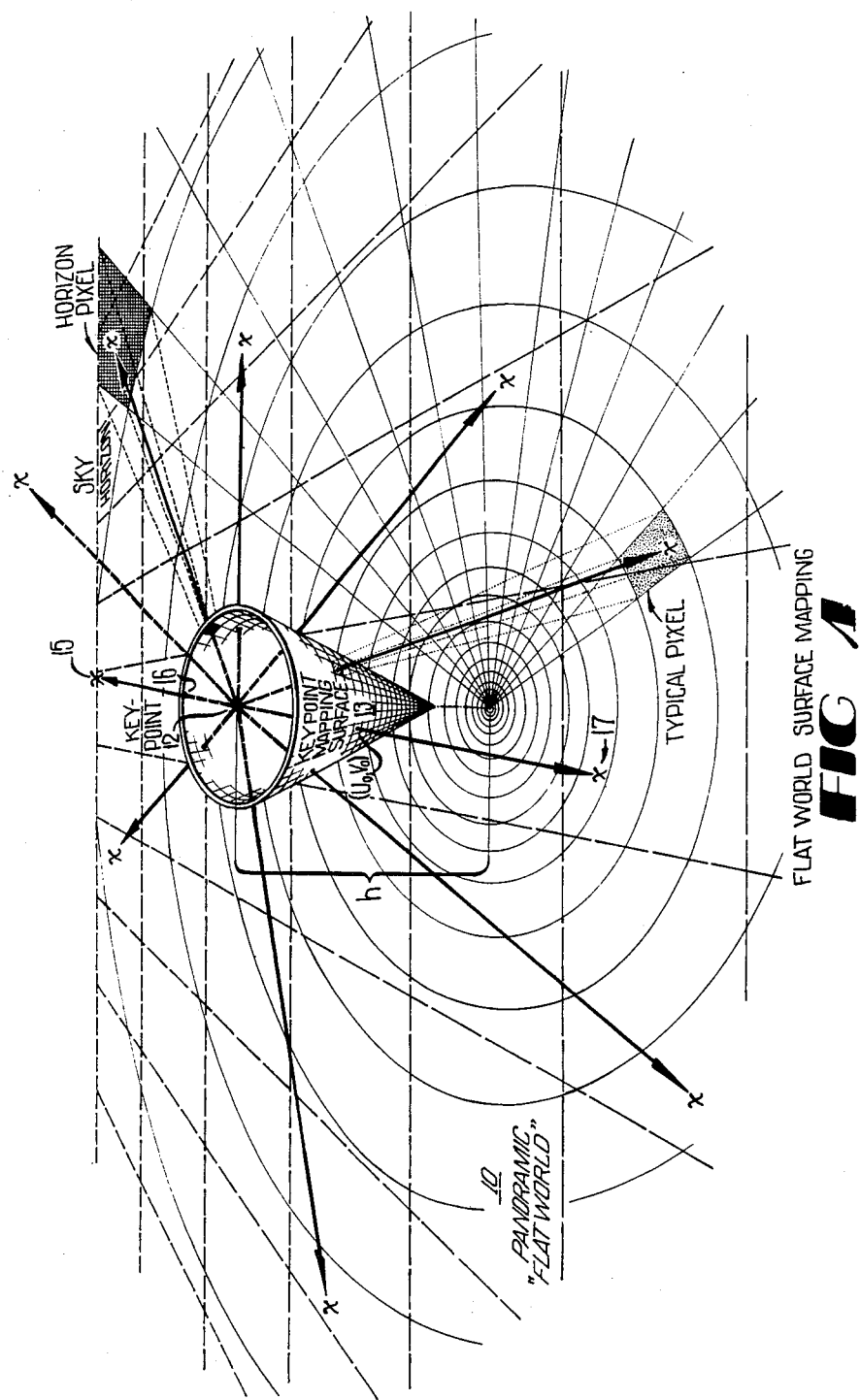

Referring now to the drawings, in which like numerals indicate like elements throughout the several figures, attention first should be directed to FIG. 1 for an exposition on the methodology employed in the present invention for image generation. FIG. 1 illustrates the technique employed for mapping a panoramic view of an imaginary flat world 10 onto a keypoint projection or mapping surface 13. Simply stated, the imaginary space through which an observer "travels" includes a flat two-dimensional surface in all directions to the horizon. Image data representing a panoramic view of the flat world are stored on a storage medium associated with a predetermined keypoint such as illustrated at 12. A "keypoint" is a point in imaginary space suspended at a predetermined height h above the imaginary flat world 10. Image data comprising a predetermined number N of pixels representing the panoramic view from the keypoint are then mapped onto the mapping surface 13 so that it may be retrieved by the circuitry disclosed hereinbelow.

In other words, to create a set of keypoint data a keypoint observer is positioned at the keypoint and progressively rotates about the keypoint while "looking" out to the horizon. At each incremental position which corresponds to the minimum picture element resolution, the color value of the view seen by the keypoint observer, which is a slit or slice of the keypoint projection surface, is noted at a column on the mapping surface. The color values may be represented by red, green, and blue (RGB) color components; in the preferred embodiment, the color values are represented by a multiplexed analog component (Y,U,K) system.

In still other words, a ray is traced from the keypoint observer at 12 through the mapping surface to a point on the imaginary flat world such as the point 15 on the horizon. The color values of the point 15 are the associated with the conic coordinates of the mapping surface 13 in the preferred embodiment, for example the point 20 or pixel on the mapping surface.

As an additional example, note in FIG. 1 the point 17 on the imaginary flat world. A ray traced from the keypoint 12 through the mapping surface 13 to the point 17 defines a unique pixel location ($U_0$, $V_0$) on the mapping surface 13, where $U_0$ represents horizontal pixel position as measured along a circular section taken through the conical projection surface used in the preferred embodiment, and $V_0$ represents vertical pixel position as measured by row number which corresponds to a particular circular section. The process of mapping the flat world to the projection surface 13 is effectuated in principle by rotating the keypoint observer about the keypoint 360° while mapping the horizon picture elements such as 15 to the projection surface 13 top row 19 of the, lowering the "line of sight" by one picture element or resolution (which in effect selects the next lower circular section), and repeating the rotating step 360°, until the entire panoramic view of the flat world has been mapped onto the mapping surface 13. In the preferred embodiment, the panoramic flat world is mapped onto the mapping surface to a horizontal resolution of $360/1920 = 0.1875$ degrees, which represents 1920 pixels per row. The mean vertical resolution is $90/384 = 0.234$ degrees, which represents 384 pixels per column. Accordingly, it will be appreciated that each keypoint requires storage of a predetermined number $N = 1920 \times 384 = 737,280$ pixels, from which a sampled set of n pixels are retrieved to provide an image for a given eyepoint within the predefined space.

As mentioned, in the preferred embodiment each of the stored images associated with each keypoint is a 360° panoramic view. With the storage of such panoramic data, it is possible to generate a 360° view for the observer. In other words, with only slight modification the backwards view from the simulator vehicle can be generated, namely, by providing another channel of circuitry for generating an image for a back-facing CRT. However, it should be understood that it is possible to limit the image associated with the keypoint and thereby effectuate savings in data storage requirements. For example, by precluding rearward views for the observer, and by storing keypoint data only for the portions or regions of the panorama visible from an aircraft cockpit (e.g., forward and sideward) at a given position in space, a less-than-panoramic keypoint image can be stored. The method of mapping the less-than-360° panorama to the projection surface is the same. In such an embodiment, the keypoint selected will still be a function of the spatial orientation and location of the observer, but either less data can be stored while still maintaining resolution, or alternatively the same amount of data can be stored for a higher image resolution, or the address generation equations might be simplified.

It will be observed in FIG. 1 that the mapping surface 13 in the preferred embodiment comprises an inverted cone suspended above the flat world. It should be understood that the mapping surface 13 does not correspond to any actual geometric structure, but rather corresponds to an imaginary geometric surface positioned in imaginary space for purposes of defining a projection surface. It shall also be understood that in the preferred embodiment there is no storage of image data for portions of the image above the horizon line (i.e., the "sky" region), hence the mapping surface 13 has a "base" which is the base of the inverted cone.

Additionally, it should be understood that the choice of an inverted cone in the preferred embodiment is merely exemplary and not by way of limitation. Those skilled in the art will understand that other projection geometries, such as an inverted pyramid, cylinder, or the bottom of a half-sphere, will also provide a suitable projection surface for mapping the imaginary space. The choice of a geometric configuration for use as a mapping surface is primarily made as a function of the complexity of the address calculation. For example, a cone was chosen in the preferred embodiment because the address calculations for the conic surface are simpler to implement in hardware than several other surfaces. Other geometric mapping surfaces require different coordinate systems, for example a purely spherical coordinate system might be suitable for other applications.

It will be appreciated that the result of the preceding discussion is a mapping of at least a portion of a panoramic view of the world or first surface 10 to be simulated in the imaginary space onto a second or mapping surface 13 by providing as picture elements the picture values of areas of the mapping surface 13 corresponding to areas of the first surface 10 projected onto the mapping surface 13.

6.1.2 KEYPOINT IMAGE CREATION

Next will be a discussion of the methodology employed in the preferred embodiment for creating the keypoint images. First of all, it will be understood that in the preferred embodiment a flat world terrain model is employed as the map of the terrain which is to be represented by the images presented in the system. That is, there is no three-dimensional information in the map, as if the runway and surrounding areas were perfectly flat. There are two advantages to use of a flat terrain model. One advantage is that there are no occlusion problems, as there is nothing in the data base that can hide anything else. Another advantage is that the equations representing the imaginary space are simpler when everything is on the same plane. Note that a flat world was chosen in the disclosed embodiment for simplicity of implementation. However, the same techniques disclosed herein can be extended to nonflat or raised relief surfaces.

It will by now be appreciated by those skilled in the art that the present invention is particularly suited for use as a visual system in a flight simulator. In particular, the images of airports and other similar terrain can be created using photographic techniques or high resolution computer graphic techniques in order to generate a flat two-dimensional map of a terrain that will form the base or ground in the imaginary space. After the creation of the original image using such techniques, the two-dimensional terrain image then is remapped to the projection surface in the manner described herein. After the image has been mapped to the projection surface, there is no further need for the original image, and in fact the present invention and the preferred embodiment of same makes no use whatsoever of the original image. The keypoint projection image is the sole image data required to generate the plurality of images required to simulate movement within the imaginary space. All that is needed is the keypoint image data and information about the location of the keypoints within the imaginary space.

Considerations important to data base generation include the image projection, reduction of aliasing, and proper filtering. The image projection must be computed to provide adequate resolution. The particular method employed in the preferred embodiment uses fractal techniques to generate the texture, with an off-line computer graphics station.

Another consideration relates to antialiasing. Since moving pictures are generated by the present invention, continuity of the images between keypoints becomes extremely significant. With switched keypoints (which result when there is a keypoint transition), portions of an image which are sampled in one keypoint might be omitted in the next, resulting in visual artifacts. Area sampling, discussed further below, is employed in the image creation to reduce this problem in the disclosed embodiment.

Accordingly, it will be understood that manipulating keypoint images in real-time may prove problematic if the image data is not originally generated with attention to the subtleties of sampling and filtering. First of all, any filtering applied to the keypoint data must be "zero-phase", that is, it does not introduce any apparent shift in any components of the terrain model. For example, even a one pixel shift applied to every keypoint may cause a noticeable mismatch in transition between keypoints.

Thus, the image data must be mapped to the keypoints so that if data from two different keypoints were taken for a given output screen pixel for a given output position and orientation, these data would correspond. In other words, for a transition between keypoints where there has been a movement in imaginary space such that data from a different keypoint must be retrieved to display the next screen, there will be no objectionable transition in the output screen images.

In most applications incorporating the present invention, it will be a goal to store as large a visual data base as possible on a single video disc. Accordingly, the keypoints will be spaced as far apart as possible without introducing objectionable changes in resolution at keypoint transitions. The introduction of a small shift in keypoint images is greatly magnified at distances far from the keypoint and, if not properly compensated, can reduce the permissible keypoint spacing.

Secondly, the keypoint image data can be viewed as a sampled signal of the imaginary terrain. In fact, it is the product of an array of impulses (arranged according to the keypoint projection surface) with a terrain map, both of which are continuous two-dimensional signals. If aliasing is present in the keypoint image data, it will appear in the output image as a mismatch in the level of detail at keypoint transitions. Due to the impracticality of low-pass filtering the terrain map relative to the sampling geometry when creating the keypoint image data, area sampling is employed in the present invention during keypoint image creation. In this technique, the source terrain map is typically provided at a level of detail or resolution greater than that for the keypoint projection surface with its unique geometry. Then, areas corresponding to the individual pixel areas on the keypoint surface are essentially mapped to the ground or terrain map. The boundaries of the keypoint surface are mapped to the ground as well. Then, the intensity and color of the terrain map data base is integrated, summed up, or averaged, over the projected keypoint pixel area on the ground. The average intensity and color value is used as the keypoint pixel value.

Although area sampling does not produce an alias-free discrete representation of a terrain map, it renders nearly all sampling artifacts caused by mapping from the terrain to the keypoint virtually imperceptible.

6.1.3 KEYPOINT LAYOUT AND SELECTION

Figure 2:
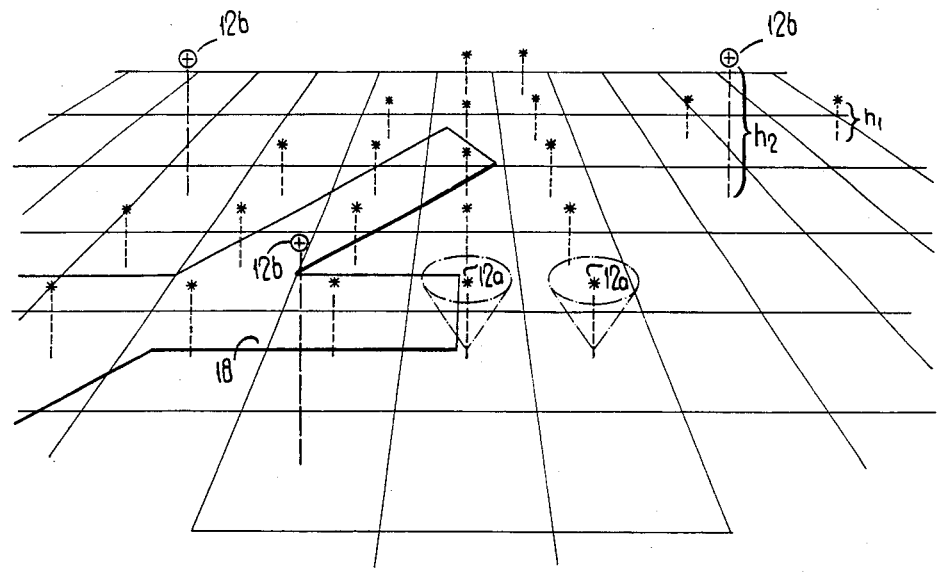
Figure 3:
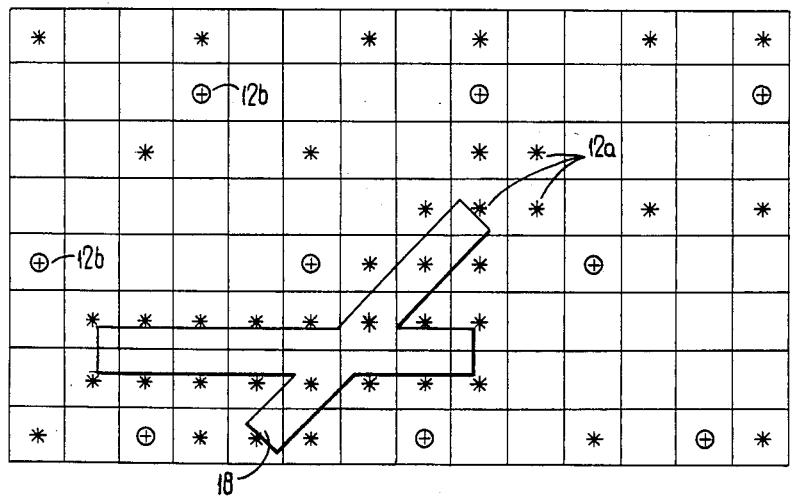

FIG. 2 illustrates the keypoint layout within an exemplary imaginary hypothetical space 10. In the example of FIG. 2, the flat world 10 includes certain geographical features which are particularly significant for flight simulation, namely, the presence of an airport runway 18. In regions of particular interest such as this runway, the keypoints are concentrated in a higher density, primarily because it is expected that an observer will be traveling most frequently and at lower altitudes through these regions of interest and it is desirable to provide the maximum image quality and resolution in these regions. Accordingly, it will be appreciated in FIG. 2 that the keypoints 12a associated with a given first level are concentrated in regions of interest such as the airport, but are less concentrated in regions further away from the special interest area where the observer will be traveling at higher altitudes.

The keypoints 12a signified with an asterisk (*) signify the keypoints in a given first plane associated with the flat world 10. Each of these keypoints 12a are positioned at a predetermined first height $h_1$ above the world 10.

Note further in FIG. 2 that in the preferred embodiment there is provided a plurality of keypoints 12b signified with a plus sign (+) positioned at a predetermined second height $h_2$ above the flat world 10. The keypoints at higher elevations such as $h_2$ are interspersed throughout the imaginary space at a lower density than the keypoints at the lower altitude $h_1$ due to the reduced need for terrain resolution at higher altitudes. It will be understood that all of the keypoints 12b are positioned at the same imaginary altitude $h_2$. It should be also understood that other planes of keypoints (not illustrated in FIG. 2) are provided in the preferred embodiment at higher altitudes above $h_2$, and that the image data associated with such higher altitude keypoints represents panoramic images mapped in the manner described in connection with FIG. 1 for keypoint observers positioned at such higher altitudes.

Each keypoint is theoretically capable of creating an entire screen image for any point in the imaginary space, since each keypoint represents an entire panoramic image. However, the image quality will be degraded for eyepoint locations far away in imaginary space from a single keypoint. Thus, it will be understood that for optimal image quality and resolution in low altitude regions of interest such as runways and attack targets, keypoints should be arranged at lower altitudes such as $h_1$ in these regions. In particular, the keypoint layout employed in the disclosed embodiment for flight simulation may be considered (1) an arrangement of keypoints defining an inverted truncated pyramid for the first 500 to 1000 feet of altitude in regions of particular interest such as targets or runways, with the recommended attack or runway glide slope defining the pyramid sides, and (2) above 1000 feet, an arrangement of keypoints defining a plurality of planes of progressively decreasing keypoint density, each spanning the imaginary space from end to end.

In the disclosed embodiment, the keypoints are arranged in planes parallel to the imaginary flat ground. The altitude of a given plane is four times the altitude of the next lower plane. For a particular plane, the keypoint spacing is twice the altitude of the plane. Thus, the preferred altitudes of the planes are:

TABLE I

| Plane No. | Plane Altitude | Keypoint Spacing | Valid Eyepoint Altitudes |
|---|---|---|---|
| 1 | 32 ft. | 64 ft. | 0.0–51.2 ft. |
| 2 | 128 | 256 | 51.2–204.8 |
| 3 | 512 | 1024 | 204.8–819.2 |
| 4 | 2048 | 4096 | 819.2–3276.8 |
| 5 | 8192 | 16,384 | 3276.8–13,107.2 |
| 6 | 32,768 | 65,536 | 13,107.2–100,000.0 |

In Table I, the valid eyepoint altitudes indicate when a new keypoint will be selected based on eyepoint altitude. The rule employed in the preferred embodiment is that the transition altitude between two keypoint planes is equal to the harmonic mean of the altitudes of the two planes. Specifically, if XL represents the altitude of the lower plane and XU is the altitude of the upper plane, the transition altitude XT is given by the equation XT=(XL * XU)/((XL+XU)/2). Note that this rule is not used to determine the lowest valid altitude for plane no. 1 or the highest valid altitude for plane no. 6.

Several techniques may be employed for keypoint selection, depending on operational requirements. One simple technique for keypoint selection involves merely choosing the closest keypoint to the eyepoint, which is computationally fast. In order to increase the area which can be spanned with a given data storage capacity, the keypoint spacing can be increased in the manner described above and a keypoint chosen which is closer to most of the terrain in the field of view of the observer. For example, if the eyepoint is at 512 feet and the field of view is perfectly orthogonal to the ground and is 48 by 36 degrees, the point on the ground closest to the eyepoint is actually 1576 feet away. This represents about 1.5 keypoint spacings for this altitude in Table I. Most of the terrain in the field of view, however, will be substantially farther away than this.

The preferred keypoint selection method chooses the keypoint closest to the point on the ground seen at the bottom center of the output screen. However, the position of the selected keypoint is restricted so as not to vary by more than plus or minus one keypoint spacing in either the west-east or south-north directions. Since the keypoints are arranged in a gridwork running west-east and south-north, the keypoints are referred to through an ordered pair notation in the preferred embodiment. An ordered pair selects a particular keypoint from the keypoint data memory for use in generating an image For example, assume the closest keypoint to the eyepoint is at (6, 15) and the keypoint closest to the point on the ground at the bottom center of the screen is at (8, 18). Then the selected keypoint would be at (7, 16). If there is not a keypoint stored for this location, then a violation of the layout rules described in Table I has occurred, for example, the observer is travelling too low far away from the runway, substantially off the expected glide path. In order to provide an image, albeit a degraded one, the selection method is employed using the next higher keypoint plane. Eventually, a keypoint location will be computed for which a keypoint is stored, since the three upper keypoint planes in Table I span the entire imaginary space in the disclosed embodiment.

The above described procedure for keypoint selection can be reduced to the following method, which is implemented as a program for the master controller employed in the preferred embodiment (the variables are defined further in section 6.2.1.):

1. Select the keypoint plane-based eyepoint altitude as given in Table I, as a function of input from the host.

2. Compute the variables XFOCUS and YFOCUS, which represent the point on the ground at the bottom center of the screen:

A. Define the eyepoint position as (x,y,z) and the heading or azimuthal angle as PAN. Denote the tilt angle by TILT and half the vertical field of view by PHIMAX.

B. If −90 degrees TILT+90 degrees, then set PHIFOCUS=−PHIMAX+TILT. Otherwise, set PHIFOCUS=PHIMAX+TILT.

C.

XFOCUS x−z * (cos PAN/tan PHIFOCUS)
   YFOCUS y−z * (sin PAN/tan

3. Determine the index of the keypoint in this plane closest to the point (XFOCUS, YFOCUS), i.e., the keypoint spacing in feet represents the minimum index amount for a given plane. Denote this index as (IFOCUS, JFOCUS).

4. Determine the index of the keypoint in this plane closest to the point (x,y) and denote it as (I,J).

5. Compute adjustment factors IFOCUSADJ and JFOCUSADJ as follows:

IFOCUSADJ=min (1, max (−1, IFOCUS−I))
   JFOCUSADJ=min (1, max (−1, JFOCUS−J))

6. Denote the index of the keypoint selected by (ISELECT, JSELECT), and compute these parameters as follows:

ISELECT=I+IFOCUSADJ
   JSELECT=J+JFOCUSADJ

7. Employ the keypoint selected in step 6 to generate the image. If there is not a keypoint stored in the data base at this index, increment the plane number by one and repeat the method at step 3.

6.2 EQUATIONS FOR IMPLEMENTATION IN THE PREFERRED EMBODIMENT

6.2.1 DEFINITION OF VARIABLES

Figure 4:
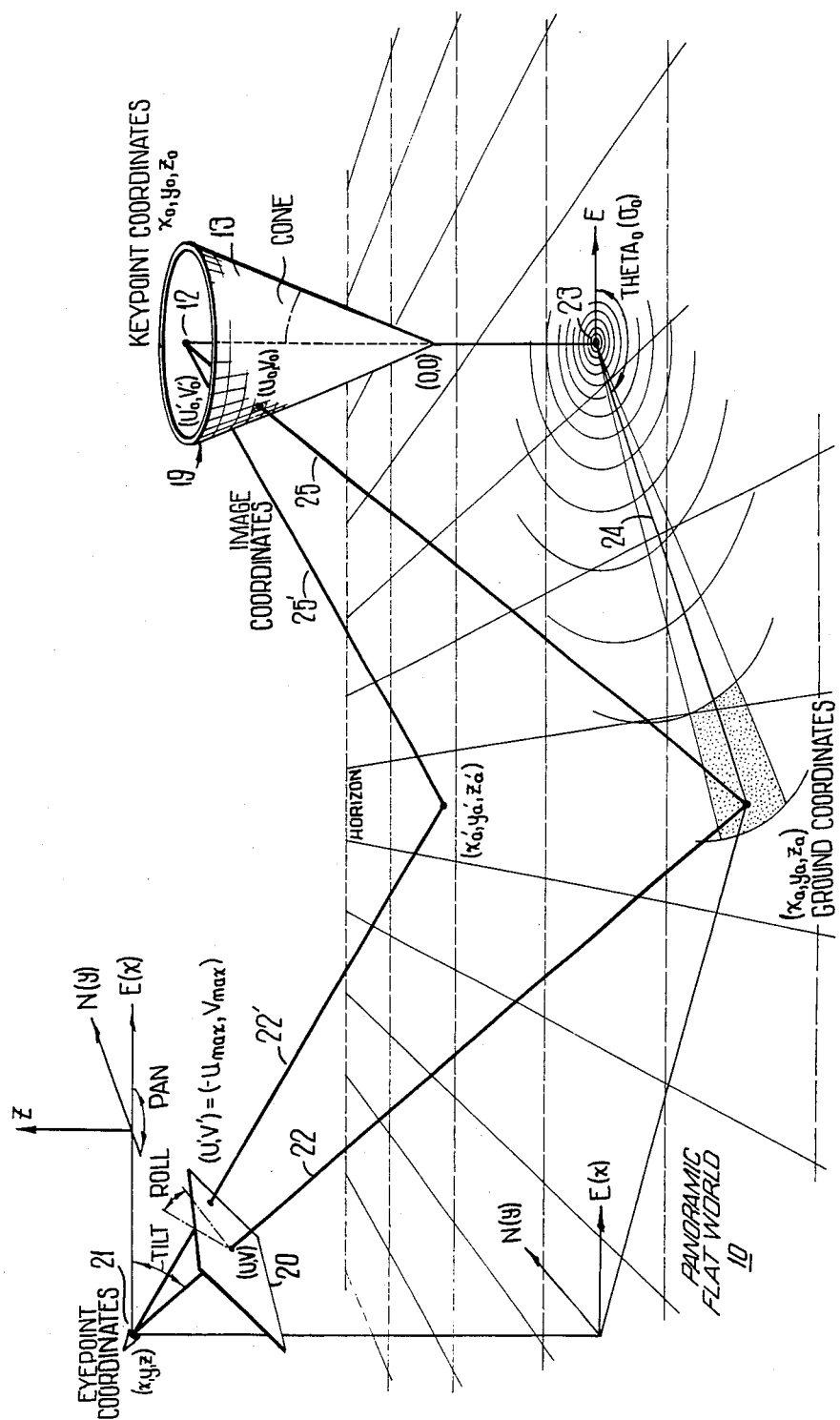

Turning next to FIG. 4, there will now be described the mathematics underlying the image sampling or extrapolation technique employed in the preferred embodiment. The objective is to find the coordinates on the projection surface of the selected keypoint for a given screen projection surface coordinate, eyepoint position and orientation, and a keypoint position. First, it is necessary to orient the various positions of the observer eyepoint, the keypoint, and the imaginary ground relative to one another so that the relationship between these constructs is clearly defined. It will of course be understood that the objective in the preferred embodiment is to present an image of a hypothetical flat world to an observer moving through an imaginary space. In the preferred embodiment the observer, or at least the eye of the observer called the "eyepoint" 21, takes a position within an imaginary three-dimensional space signified by the variable set (x,y,z). In the imaginary space, the x and y axes are along the flat ground, and the origin is fixed to some arbitrary position in the ground relative to the 50 mile by 50 mile data base in the preferred embodiment. The variable z represents the altitude, in feet, from the ground. Furthermore, the variable x extends positively in the easterly direction, while the variable y extends positively to the north in the imaginary space.

Still referring to FIG. 4, imagine next that a viewing screen 20 is positioned in front of the eyepoint 21. The viewing screen of course in the preferred embodiment is a raster scanned color CRT. Assume further that the viewing screen 20 is positioned at a predetermined or given orientation relative to the x,y,z axes. The orientation of the planar viewing screen determines the attitude and orientation of the observer relative to the imaginary space, for example if the observer is tilted or rolling relative to the horizon. Accordingly, the "look angle" for the observer positioned at location (x,y,z) is defined by the variables PAN, TILT, and ROLL in degrees.

Figure 5:
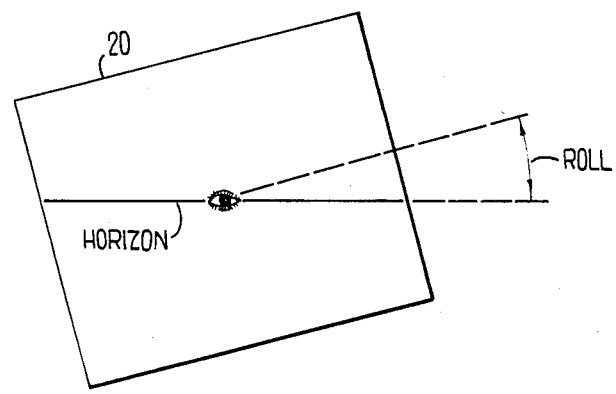

Referring to FIG. 4, the variable PAN is a horizontal angle or azimuth. Zero degrees is defined as being in the x or east direction, and the angle increases to the north. The TILT angle is defined as the vertical or elevation angle. A perfectly horizontal TILT angle represents zero degrees, and the angle is positive above the horizon. It will be noted in FIG. 4 that the angle TILT is about −45°. Finally, the ROLL angle is defined as the roll angle of the viewing screen 20 relative to the center of the screen. When the viewing screen is perfectly level, the ROLL angle is zero degrees, and increases in the positive direction as the horizon on the screen moves clockwise. For example, it will noted in FIG. 5 that the angle ROLL illustrated therein is about +15°. In the preferred embodiment, to avoid ambiguity the attitude angles are applied in the following order: PAN, TILT, and ROLL. Accordingly, it will be appreciated that first the PAN angle is established, then the TILT angle is established, and finally the ROLL is applied. A "max" subscript, for example TILT$_{max}$ or PAN$_{max}$, represents the angular limits of the observer's field of view.

The next position to be defined is the keypoint position. The keypoint position is defined as occupying a position in the imaginary space at $(x_0,y_0,z_0)$. In accordance with the invention, given any eyepoint position (x,y,z) and attitude angles (PAN, TILT, ROLL) in imaginary space, one and only one associated keypoint is selected, and the image data associated therewith retrieved from memory and displayed in the manner to be described. Thus, for purposes of the definitions which follow, it will be understood that a predetermined keypoint $(x_0,y_0,z_0)$ associated with a given observer position (x,y,z) and attitude (PAN, TILT, ROLL) in the imaginary space is uniquely defined. It should be understood that there are a plurality of spatial coordinates for the observer eyepoint which will result in selection of the same keypoint, inasmuch as the image data associated with each keypoint represents a panoramic view in all directions and for all spatial orientations.

Finally with respect to the keypoint coordinates, each keypoint possesses an angular dimension represented by the variable CONE (FIG. 4), which represents the angle in degrees of the conic projection surface 13 relative to a vertical line through the apex.

Figure 6:
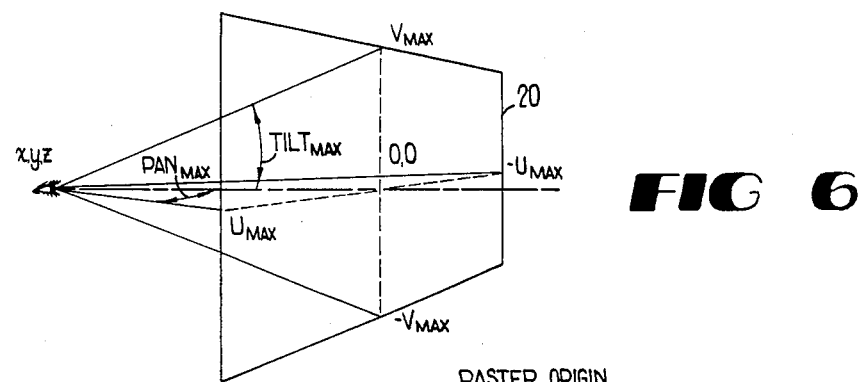
Figure 7:
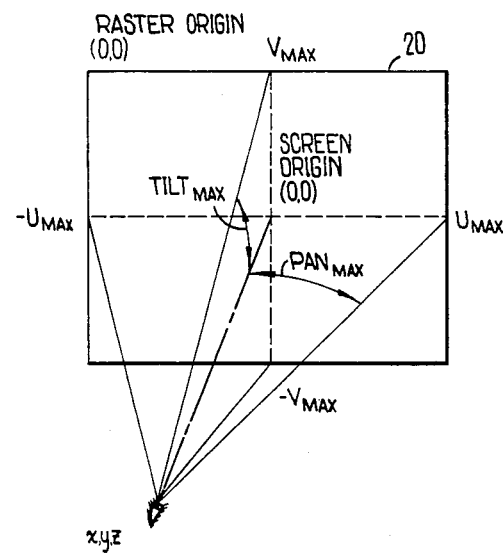

The next parameters to be defined are the ground coordinates in imaginary space. Assume as in FIG. 4 that the eye of the observer, positioned at (x,y,z), is looking directly at a point on the imaginary ground $(x_a,y_a,z_a)$. Thus, it will be appreciated that a ray 21 traced from the eyepoint (x,y,z) to the ground $(x_a,y_a,z_a)$ defines a unique point on the viewing screen 20, which is represented by the variables (u,v). Each point (u,v) represents a predetermined pixel on the viewing screen 20. As shown in FIGS. 6 and 7, the variable u represents the horizontal dimension of the screen, wherein the origin is positioned at the center of the screen and is positive to the right. The variable v represents the vertical dimension, having its origin also at the center of the screen, and is positive in the up direction, that is, to the top of the viewing screen.

It will noted in FIGS. 6 and 7 that there are limits of the field of view of the observer, inasmuch as the observer is positioned back from the center of the viewing screen. These limits represent the edges of the viewing screen 20. Thus, the pixel limits in the horizontal direction are represented by the numbers $U_{max}$, $-U_{max}$, while the pixel limits of the field of view in the vertical direction are represented by the numbers $V_{max}$, $-V_{max}$. Note further in FIGS. 6 and 7 that the angles for the limits of the field of view are represented by the numbers TILT$_{max}$ and PAN$_{max}$.

The objective of defining the screen coordinate variables (u,v) is to retrieve and display a pixel at the location u,v on the viewing screen 20 which represents the image the observer would see looking through the screen 20 at the imaginary ground, at the point $(x_a,y_a,z_a)$. The screen position (u,v) maps into the position $(U_0,V_0)$, which is a "position" on the keypoint projection surface 13. It should be understood that the projection surface 13 merely represents an imaginary projection surface on which is "painted" the entire panoramic scene in the manner as described in connection with FIG. 1. Thus, the keypoint pixel coordinate $(U_0,V_0)$ used to determined a pixel value to be displayed on the screen 20 at the position (u,v) is defined by extending a ray 25 from the ground point $(x_a,y_a,z_a)$ up to the projection surface 13 through the keypoint $(x_0,y_0,z_0)$. The intersection of the ray from $(x_a,y_a,z_a)$ to $(x_0,y_0,z_0)$ uniquely defines a point $(U_0,V_0)$ on the projection surface 13. Thus, the entire screen 20 is "painted" by raster scanning and displaying at each and every pixel location (u,v) on the screen a pixel obtained by extending a ray from the observer at (x,y,z) through the viewing screen 20 to the ground point $(x_a,y_a,z_a)$ up to the keypoint $(x_0,y_0,z_0)$ and displaying a pixel determined by the coordinates $(U_0,V_0)$ where the ray 25 intersects the projection surface 13.

The limits of the field of view of the screen 20 in FIG. 4 define the limits of the set of data which are displayed for any one given screen image For example, the pixel (u',v') is positioned at the upper left-hand corner of the screen (relative to the eyepoint), and represents the point on the ground $(X_a',Y_a',Z_a')$. This pixel corresponds to the limits of the field of view ($-U_{max}, V_{max}$). Tracing the rays 22' and 25' locates the displayed pixel at address ($U_0', V_0'$) on the projection surface. In one sense, each corner of the viewing screen defines a point on the projection surface which bounds the region on the projection surface which contains the pixel data to be displayed for the current frame. However, it should be understood that the pixel data to be displayed are selected by sampling rather than by display of all data within the boundary. It will be appreciated that since the bounded region just described is on the flat earth or ground, and that this region is then mapped to the keypoint projection surface, it is not strictly true that the sampled pixel data uniquely defines a bounded region on the projection surface nor necessarily defines a bounded region on the projection surface.

One further definition is required prior to deriving the equations for obtaining a pixel to be displayed. If a line is extended from the keypoint ($x_0, y_0, z_0$) to the ground, it will intersect the ground coordinates through the apex of the projection surface 13 at a point 23. Since the image data associated with the keypoint is a panoramic view, there is an angle between the x axis in the easterly direction and the line 24 extending from the ground point ($x_a, y_a, z_a$) to the point 23. This angle is defined as $theta_0$, which is used in finding $U_0$.

The keypoint image coordinate ($U_0, V_0$) in pixels is defined in a manner similar to the screen coordinates (u,v) wherein $U_0$ is a horizontal or azimuthal variable, with the zero position in the easterly direction and increasing to the south or $-y$ axis. The variable $V_0$ is the vertical or elevational dimension, with $-V_{0max}$ at the apex of the conical projection surface, and increasing positively upwards in the z direction. Note further that the keypoint image comprises terrain or ground data only. The portions of the image which constitute sky are computed in a manner as will be described below, and no separate data corresponding to the sky is stored. It will be understood that the foregoing described flat world technique could also be employed to produce sky and cloud imagery as well.

6.2.2 FRAME RATE CONSTANTS

Equations that are employed to determine keypoint coordinates ($U_0, V_0$) as a function of screen coordinates (u,v), eyepoint position (x,y,z), eyepoint orientation (PAN, TILT, ROLL), and keypoint position ($x_0, y_0, z_0$) can be written for various keypoint and eyepoint projection surfaces, it of course being understood that in the preferred embodiment the keypoint projection surface is a conic surface and the eyepoint projection surface is a flat display screen. In the preferred embodiment, it has been shown by analysis of the mathematics underlying these equations that they may be rewritten in terms of several intermediate variables (A,B,C) to simplify their computation. It can be shown that the equations for determining the intermediate variables (A,B,C) given the screen coordinates (u,v) take the form of the following equations:

$A = a1 * u + a2 * v + a3$  (Equation 1)

$B = b1 * u + b2 * v + b3$  (Equation 2)

$C = c1 * u + c2 * v + c3$  (Equation 3)

where the variables a1, a2, a3, b1, b2, b3, c1, c2, and c3 represent frame rate constants, that is, they do not change during the computation of an entire output image. In these equations, single asterisks (*) represent multiplication, while double asterisks (**) represent exponentiation.

Moreover, and equally importantly, it has been determined by analysis of the mathematics of Equations 1, 2, and 3 that the coefficients can be computed at frame rate, that is, the numbers do not change for a given frame. Other parameters must be computed at pixel rates, that is, a separate computation is required to define each pixel. The frame rate constants are defined in terms of the variables defined in connection with FIG. 4 as follows:

$a1 = [(((x - x_0)/z_0) * \cos TILT * \sin ROLL) +$  (Equation 4)

$((z/z_0) * ((\cos PAN * \sin TILT * \sin ROLL) -$ $(\sin PAN * \cos ROLL)))] * [(\tan PAN_{max})/U_{max}]$ $a2 = [(((x - x_0)/z_0) * \cos TILT * \cos ROLL) +$  (Equation 5)

$((z/z_0) * ((\cos PAN * \sin TILT * \cos ROLL) +$ $(\sin PAN * \sin ROLL)))] * [(\tan TILT_{max})/V_{max}]$ $a3 = (((x - x_0)/z_0) * \sin TILT) -$  (Equation 6)

$((z/z_0) * \cos PAN * \cos TILT)$ $b1 = [(((y - y_0)/z_0) * \cos TILT * \sin ROLL) +$  (Equation 7)

$((z/z_0) * ((\sin PAN * \sin TILT * \sin ROLL) +$ $(\cos PAN * \cos ROLL)))] * [(\tan PAN_{max})/U_{max}]$ $b2 = [(((y - y_0)/z_0) * \cos TILT * \cos ROLL) +$  (Equation 8)

$((z/z_0) * ((\sin PAN * \sin TILT * \cos ROLL) -$ $(\cos PAN * \sin ROLL)))] * [(\tan TILT_{max})/V_{max}]$ $b3 = (((y - y_0)/z_0) * \sin TILT) -$  (Equation 9)

$((z/z_0) * \sin PAN * \cos TILT)$ $c1 = ((\tan PAN_{max})/U_{max}) * \cos TILT *$  (Equation 10)

$\sin ROLL * \tan CONE$ $c2 = ((\tan TILT_{max})/V_{max}) * \cos TILT *$  (Equation 11)

$\cos ROLL * \tan CONE$ $c3 = (\sin TILT * \tan CONE)$  (Equation 12)

6.2.3 OUTPUT MEMORY ADDRESS EQUATIONS MJ, MK

It has been determined from analysis of the geometries of the eyepoint projection surface, the imaginary ground, and the keypoint projection surface that basic equations may be derived for obtaining the address of a picture element on the keypoint projection surface as a function of a given element to be displayed on the display screen, that is for a given (u,v). Given a position in the imaginary space for the observer at (x,y,z), the numbers A,B,C resultant from the solution to Equations 1-3 form the basis for the following output equations which are used to derive the pixel ($U_0$, $V_0$). These equations are pixel rate computations, and the digital representations of these numbers form a memory address which is used to retrieve and display the RGB values of a particular pixel:

$$U_0 = (-U_{0max}/PAN_{0max}) * theta_0 \quad \text{(Equation 13)}$$
$$= (-U_{0max}/PAN_{0max}) * \arctan 2 \,[(y_a - y_0)/(x_a - x_0)]$$
$$= (-U_{0max}/PAN_{0max}) * \arctan 2 \,[(B * \text{sign } C * \text{sign } z_0)/(A * \text{sign} C * \text{sign } z_0)]$$
$$= ((-U_{0max}/PAN_{0max}) * OFT1 +$$
$$((-U_{0max}/PAN_{0max}) * (1 - (2 * S_{out1})) *$$
$$(\arctan (2 ** (\log_2 |B| - \log_2 |A|))))$$
$$\text{when} |B| < |A|;$$
$$= ((-U_{0max}/PAN_{0max}) * OFT1 +$$
$$((-U_{0max}/PAN_{0max}) * (1 - (2 * S_{out1})) *$$
$$(\arctan (2 ** (\log_2 |A| - \log_2 |B|))))$$
$$\text{when} |B| > |A|;$$
$$= ((-U_{0max}/PAN_{0max}) * OFT1$$
$$\text{when} |B| = |A|.$$

In Equation 13, the variable OFT1 represents one selected value from the contents of an offset table for computing $U_0$. This table holds values that make the computation of $U_0$ practical by taking advantage of the eight-fold symmetry of the arctan function. The value of OFT1 is selected from a table according to the value of four Boolean equations given in Table II. Note that arctan 2 (y/x) is defined as arctan (y/x) if x≧0, and arctan (y/x)+180° if x<0.

It will be observed in Equation 13 that the formula for $U_0$ takes different forms depending upon certain conditions set forth in the equations. These conditions transits into the values of the logical variables BGTA, BEQA, SA, and SB, as shown in the following table:

TABLE II

| OFT1 Table | | | | |
|---|---|---|---|---|
| Inputs | | | | OFT1 (used in |
| Sout2, | S180, | S90, | Soff | Equation 13) |
| 0 | 0 | 0 | 0 | 0 deg. |
| 0 | 0 | 0 | 1 | 0 deg. |
| 0 | 0 | 1 | 0 | +90 deg. |
| 0 | 0 | 1 | 1 | −90 deg. |
| 0 | 1 | 0 | 0 | +180 deg. |
| 0 | 1 | 0 | 1 | −180 deg. |
| 0 | 1 | 1 | 0 | +90 deg. |
| 0 | 1 | 1 | 1 | −90 deg. |
| 1 | 0 | 0 | 0 | +45 deg. |
| 1 | 0 | 0 | 1 | −45 deg. |
| 1 | 0 | 1 | 0 | +135 deg. |
| 1 | 0 | 1 | 1 | −135 deg. |
| 1 | 1 | 0 | 0 | +45 deg. |
| 1 | 1 | 0 | 1 | −45 deg. |
| 1 | 1 | 1 | 0 | +135 deg. |

TABLE II-continued

| OFT1 Table | | | | |
|---|---|---|---|---|
| Inputs | | | | OFT1 (used in |
| Sout2, | S180, | S90, | Soff | Equation 13) |
| 1 | 1 | 1 | 1 | −135 deg. |

SDIV = BGTA
SOFF = NOT SB
S90 = BGTA OR (BEQA AND (NOT SA))
S180 = NOT SA
SOUT1 = (NOT BGTA) XOR (SA XOR SB)
SOUT2 = BEQA
where BGTA = 1 when $|B| > |A|$,
  = 0 when $|B| \leq |A|$
BEQA = 1 when $|B| = |A|$,
  = 0 otherwise
SA = 1 when A < 0,
  0 when A ≧ 0
SB = 1 when B < 0
  0 when B ≧ 0

Those skilled in the art will understand that the offset for use in Equation 13 is derived upon application of the condition set forth in Table 1 as a function of the conditions set forth therein, after computation of the variables A and B in Equations 1-3.

In a similar manner, the output equation for $V_0$ is formed in accordance with the following equations:

$$V_0 = V_{0max} * [((x_a - x_0) \cos theta_0 + \quad \text{(Equation 14)}$$
$$(y_a - y_0) \sin theta_0 - z_0 \tan \text{CONE})/$$
$$((x_a - x_0) \cos theta_0 +$$
$$(y_a - y_0) \sin theta_0 - z_0 \tan \text{CONE})]$$
$$= V_{0max} *[(A \cos theta_0 + B \sin theta_0 - C)/$$
$$(A \cos theta_0 + B \sin theta_0 + C)]$$
$$= V_{0max} *[(A - C \cos theta_0)/(A + C \cos theta_0)]$$
$$\text{for } -45° \leq theta_0 \leq 45° \text{ or } 135° \leq theta_0 \leq 225°$$
$$= V_{0max} *[(B - C \sin theta_0)/(B + C \cos theta_0)]$$
$$\text{for } -45° \leq theta_0 \leq 135° \text{ or } 225° \leq theta_0 \leq 315°$$
$$= V_{0max} * ((1 - RP)/(1 + RP)) * (1 -$$
$$(2 *RINV)) *(1 - REQ)$$

where
RP = $2**(MPYC-\log_2 |A|)$  FOR BGTA = 0, RINV = 0
  = $2**(MPYC-\log_2 |B|)$  FOR BGTA = 1, RINV = 0
  = $2**(\log_2 |A| - MPYC)$  FOR BGTA = 0, RINV = 1
  = $2**(\log_2 |B| - MPYC)$  FOR BGTA = 1, RINV = 1 where

BGTA = 0 when $|B| \leq |A|$
  1 when $|B| > |A|$
RINV = 0 when MPYC ≦ the larger of $\log_2 |A|$ or $\log_2 |B|$,
  = 1 when MPYC > the larger of $\log_2 |A|$ or $\log_2 |B|$
REQ = 0 when MPYC is not equal to the larger of $\log_2 |A|$ or $\log_2 |B|$
  = 1 when MPYC = the larger of $\log_2 |A|$ or $\log_2 |B|$
MPYC = $(\log_2 |C|) +$
  $(\log_2(\cos(\arctan(2**(\log_2 |B| - \log_2 |A|)))))$
  for BGTA = 0
  $(\log_2(\cos(\arctan(2**(\log_2 |A| - \log_2 |B|)))))$
  for BGTA = 1

It will be appreciated by those skilled in the art that Equation 14 also is a multiple part equation which results in different computations as a function of the values of certain logical variables as defined in connection with the equation.

Next, it should be understood that as stated in the definition of variables, the computation $(U_0, V_0)$ constitutes a position in keypoint projection surface coordinates for a give output screen coordinate position $(u, v)$. Further manipulations of the expressions for $(U_0, V_0)$ are required in order to convert the calculations resultant from Equations 13 and 14 into hardware-usable physical addresses which are used to access a digital storage memory which contains Y,U,K color data for the pixel to be displayed at position $(u,v)$ on the viewing screen.

Accordingly, the following equation defines the hardware address MJ for use in actual memory accessing:

$$
\begin{aligned}
MJ &= U_o + MEMJ \quad \text{(Equation 15)} \\
&= OFT + ((-U_{0max}/PAN_{0max}) * (1 - (2 * \\
&\quad S_{out1})) * (\arctan(2 ** (\log_2 |B| - \log_2 |A|)))) \\
&\quad \text{when BGTA} = 0, \text{BEQA} = 0; \\
&= OFT + ((-U_{0max}/PAN_{0max}) * (1 - (2 * \\
&\quad S_{out1})) * (\arctan(2 ** (\log_2 |A| - \log_2 |B|)))) \\
&\quad \text{when BGTA} = 1, \text{BEQA} = 0; \\
&= OFT \text{ when BEQA} = 1.
\end{aligned}
$$

where OFT is related to OFT1 used in Equation 13. OFT differs from OFT1 in that it includes terms required for the "wrap around" of the polar coordinate $U_0$ on a rectangular plane of physical memory holding the keypoint. In addition, those skilled in the art will appreciate that an offset value is required to transform the screen origin (0,0) illustrated in FIG. 7 to the raster origin (0,0), which is the beginning pixel for purposes of the raster scan of the screen 20. Therefore, OFT is used in the preferred embodiment rather than OFT1. The relationship between OFT and OFT1 is given by Equation 16:

$$OFT = (-U_{0max}/PAN_{0max}) * OFT1 + MEMJ \quad \text{(Equation 16)}$$

The variable MEMJ represents a system constant that is equal to the difference between $U_0$ and the physical address of the memory that corresponds to the pixel specified by $U_0$. Thus, it will be understood the MEMJ represents a memory offset which is then combined with the value OFT1 given in Table II to form OFT used in Equation 15.

In a similar manner as for $U_0$ and MJ, the hardware address related to the pixel address $V_0$ is formed in accordance with the following equation:

$$
\begin{aligned}
MK &= ((V_0 + MEMK) * (SC)) + ((\overline{SC}) * SKY) \quad \text{(Equation 17)} \\
MK &= ((V_0 + MEMK) * (SC)) + ((\overline{SC}) * \\
&\quad ((MEMSKY/\tan CONE) * (|C|) * \\
&\quad 2**(NORM) + (OFFSKY))
\end{aligned}
$$

where SC = 1 when $C$ is negative (for TERRAIN pixel)
   0 when $C \geq 0$ (for SKY pixel)

and $\overline{SC}$ = the logical NOT of SC.

MEMSKY = system constant corresponding to number of pixels in a physical memory map allotted to SKY lookup table, minus one.

OFFSKY = system constant equal to physical address of the SKY lookup table's first pixel, corresponding to the horizon.

NORM = a frame rate integer constant from the system processor used to compensate for any normalization of A, B, C done by the system processor, for the purpose of optimizing the precision of the real-time hardware. Note that if A, B, C are multiplied by some factor ($\frac{1}{2}$**NORM) the result for the output and hardware equations is unchanged.

As in Equation 15, the variable MEMK is a system constant equal to the difference between $V_0$ and the physical address of the memory that corresponds to the pixel specified by $V_0$.

It should be noted in connection with Equation 17 that the terms associated with the logical variable $(\overline{SC})$ may be considered as "sky terms"; hence the label SKY. It will be recalled from the discussion in connection with FIG. 4 and the definition of coordinates and variables that no data for positions above the horizon in the panoramic image are stored. Rather, in the preferred embodiment of the present invention, when the input information as to the orientation and position of the observer are such that the observer is looking at the sky, circuitry forming a part of the present invention are activated which causes the generation of an address into a physical "sky" memory array of data which corresponds approximately to the color of the sky for a given angular distance above the horizon. For example, pixels having a "sky" coloration are reproduced for portions of the image corresponding to regions above the horizon line, and this coloration can change for example gradually to deeper shades of blue for pixels higher in angular elevation above the horizon.

6.2.4 HAZE APPROXIMATION

In the present invention, means are provided for overlaying an approximation of haze on a displayed series of video images to simulate variable visibility. The haze superimposed on a given scene generally is a function of distance from known terrain, for example the altitude of the observer in the imaginary space. The haze overlay may also be employed in a ground vehicle simulator, for example a battle tank simulator or automobile simulator, to overlay variable visibility due to smoke, fog, chemical mists, etc.

Haze is calculated in the preferred embodiment based on an approximation that distance from the eyepoint through the viewing screen pixel to the ground remains constant along lines on the screen that are parallel to the horizon. While this is strictly true only for some spherical output screen projections, it has proved acceptable for moderate fields of view for the planar output screen projection used in the preferred embodiment, and such an approximation is relatively easily calculated. In other words, a constant haze is superimposed on all portions of the image which are parallel to the horizon line. Thus, should the observer undergo a roll, the haze will roll as well and be maintained constant along the horizon line.

It can be shown that certain portions of the mathematical representation of a haze overlay for a generated image may be computed at frame rate rather than at pixel rate, according to the following equations:

$$f1 = (-PAN_{max}/U_{max}) * (\sin ROLL) \quad \text{(Equation 18)}$$

$$f2 = (-TILT_{max}/V_{max}) * (\cos ROLL) \quad \text{(Equation 19)}$$

$$f3 = -TILT \quad \text{(Equation 20)}$$

These frame rate constants are employed to compute a number F which is represented in terms of a displayed pixel (u,v):

$$F = f1 * u + f2 * v + f3 \quad \text{(Equation 21)}$$

After the computation of the number F, which corresponds to the angle to the horizon of a point on the output image, the variable HF (which corresponds to "haze factor") is calculated according to the following equation:

$$HF = (0.02) ** (1/(RVRZ * (\sin F))) \quad \text{(Equation 22)}$$

where RVRZ is a unitless visibility term which corresponds to the runway visual range (visibility distance) divided by the altitude of the eyepoint.

The computation of the haze factor HF is used to determine the weighted average between haze information and terrain or sky pixel information being displayed. The result of the computation of HF being is employed to compute an output color value represented by the variable OUT. The OUT signal, which comprises combined haze, terrain, and sky data, is provided to digital-to-analog converters together with the terrain or sky data, and forms the RGB output from the keypoint data memory, as represented by the following equation:

$$OUT = (HF * TERR) + ((1-HF) * HAZE) \quad \text{(Equation 23)}$$

where
TERR = terrain/sky data from the antialiasing circuit, and
HAZE = a constant representing haze color value sent by the master controller.

Equation 23 is computed for each of the three color channels red, green, and blue. The value of the output OUT represents an output color value for each color channel.

6.2.5 ANTIALIASING

In some prior art computer graphics applications, a technique called "texture mapping" is sometimes employed. In conventional texture mapping, the scene to be simulated is generated by conventional polygon generating techniques, and some type of pattern or texture from a separate data base or other source is then generated to fill in the region within each given polygon. If this technique were employed in real-time simulators, a map of the entire imaginary world would be stored in a two-dimensional array, and a raster scan display of a pixel generated according to the location of an eyepoint and orientation within a predetermined space. If resolution is desired down to, say, one foot, the amount of data required for storage for a 50 mile square data base is approximately $(5280 \text{ ft/mile})^2 * (50 \text{ miles}) * (50 \text{ miles}) * (24 \text{ bits per RGB pixel}) = 1.67 \times 10^{12}$ bits of data storage, about 209 gigabytes. Needless to say, this represents an extremely vast amount of data storage, and in practice, this technique is not used in this manner in real-time simulation.

Additionally, the above-described texture mapping technique provides a constant resolution image regardless of the distance of the observer from the terrain. As the observer's altitude increases, one pixel in the output image subtends a larger and larger number of stored pixels, each making a contribution to the color of the output pixel. Although "skipping" the contribution of some of these pixels will greatly simplify the task of building a machine to create real-time images from a vast store of information, this will cause a "twinkling" of fine detail. This has proven to be an annoying phenomenon in images used in flight simulation, in that it detracts from the realism of the image. This and other annoying artifacts caused by "skipping", i.e., subsampling the data base, are known to those skilled in the art as "aliasing".

Aliasing results in "sparkling" of terrain features, for example when a bright object is alternately displayed and then skipped over at a given altitude. The aliasing phenomenon is also referred to as "sampling artifacts". Aliasing is especially a problem for small features, for example, a painted stripe on a runway which is only three feet wide or so. At high simulated altitudes, parts of the runway stripe will flash on and off, i.e. "sparkle" because of aliasing.

Prior art efforts to reduce or eliminate sparkling typically involve deliberate blending or fuzzing of an image when lesser resolution is called for. In the present invention, steps are taken to reduce or minimize aliasing in a substantially different manner. In the preferred embodiment of the present invention, a digital filter is employed to reduce sampling artifacts. The technique employed is to reformulate the keypoint address, which selects data in the keypoint data memory, to retrieve data corresponding to the four keypoint pixels surrounding $(U_0, V_0)$. In the preferred embodiment, a finite impulse response (FIR) filter described by the following equation is employed to effectuate antialiasing:

$$\begin{aligned} h(x, y) &= tri(x, y) \\ &= (1 - |x|) * (1 - |y|) \\ &\quad \text{for } -1 \leq x \leq +1 \text{ and } -1 \leq y \leq +1, \\ &= 0 \text{ elsewhere.} \end{aligned} \quad \text{(Equation 24)}$$

Figure 8:
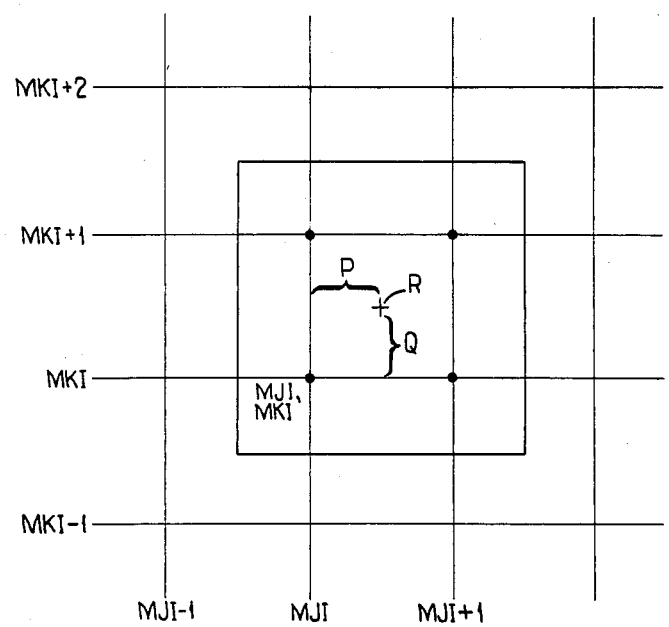
FIGS. 8 and 9 illustrate the method employed in the preferred embodiment for antialiasing.
Figure 9:
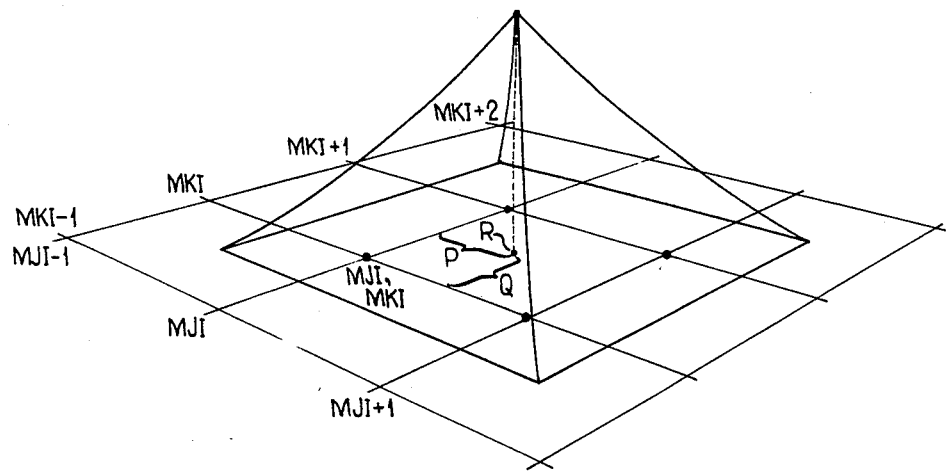

It will be appreciated that in the preferred embodiment the FIR filter preferably has a some what pyramidal-like impulse response as illustrated in FIGS. 8 and 9. The address into the keypoint image, represented by the computation of the variables MJ and MK, are reformulated for antialiasing as a function of the following equation:

$$R = (MJ, MK) = (MJI + P, MKI + Q) \quad \text{(Equation 25)}$$

where MJI and MKI are the integer keypoint pixel memory addresses, MJ, MK are resultant addresses as computed above for a resultant location R which is surrounded by four pixels, and P and Q are fractions ranging from 0 to 1.

As shown in FIG. 8, in the preferred embodiment the resultant displayed pixel R is provided as a function of the pixels (MJI,MKI), (MJI,MKI+1), (MJI+1, MKI) and (MJI+1, MKI+1). The fractional values P and Q are represented in the preferred embodiment by the subpixel address portions of MJ and MK, respectively, and are used to weight the contribution from these four retrieved data pixels to create an estimate of the "true" value of the resultant pixel R. This estimate is then used as the actual RGB value of the pixel displayed on the screen. It will therefore be understood that in the preferred embodiment, four pixels are retrieved from memory for each pixel displayed.

6.2.6 HARDWARE DATA TYPE CONVERTERS

In actually building an apparatus for manipulating the imaginary space as illustrated in FIGS. 1 and 4, and implementing Equations 1-25, many mathematical operations including angular functions, multiplication, division, and exponentials must be accomplished in real-time, and certain functions must be accomplished at pixel rates. Fast, high precision multiply and divide hardware is expensive and complex. Accordingly, in the preferred embodiment logarithmic representations of various parameters are employed. Thus, logarithmic data types are employed for certain computations so that the resultant hardware for multiplication and division can be implemented by addition or subtraction operations. Although a logarithmic data type cannot directly represent zero, and at times certain variables may actually be zero, the numerical values in the preferred embodiment represented by logarithms are represented with sufficient precision as to approximate a number very close to zero. In particular, see the discussion hereinbelow in Section 6.4 pertaining to Data Precision Considerations.

For the keypoint address generator circuitry, intermediate values A, B, and C (identified in Equations 1, 2, and 3) are computed in binary two's complement fixed point representations. For further calculation, these variables are converted to signed two's complement base-two logarithmic data types. This conversion is effectuated in two steps. First, a fixed-to-floating point conversion is done, and then the result of this conversion is transformed to a logarithmic format by separate operations on the mantissa and exponent.

Referring in this regard to FIG. 20, the data type converters 30 for conversion from a particular data type employed in the preferred embodiment to another data type are illustrated. In particular, conversion from digital representations of 32 bit fixed point, to floating point, to base two logarithmic formats, is illustrated.

After the discussion above in connection with the equations representing the imaginary space employed in the preferred embodiment, it will be appreciated that particular pixel rate variables A, B, and C are employed in certain calculations. These variables are provided in the preferred embodiment as 32 bit fixed point two's complement data representations. Each of these signals is provided first to an absolute value converter block 31. The absolute value block 31 takes the two's complement fixed point number A, B or C and forms an unsigned 31 bit binary magnitude representation provided to a shift matrix 33, plus a 1 bit sign signal designated SIGN or SM.

A leading digit detect circuit 32, comprising a plurality of priority encoders, finds the first digit out of the 32 bit input number which differs from the most significant bit, and provides this leading digit information as a 5 bit number LI. LI corresponds to the number of binary digit positions away from the most significant bit from which the leading digit is found, and accordingly represents the exponent of the input number, minus one (E-1). The number LI is provided as both the output of the float-to-log converter and as the AMT+1 input to shift matrix 33.

Shift matrix 33 is a standard digital shift matrix well known to those skilled in the art, and may be constructed with a plurality of data selectors/multiplexers. The AMT+1 input is the shift amount that is to be shifted by the shift matrix 33. The output of the shift matrix represents the floating point mantissa of the input number shifted by LI places. The shift matrix 33 output forms the 16 bit mantissa M of a floating point representation of the input number.

The three outputs comprising the sign SM, the mantissa M, and the exponent E-1 or LI can be thought of as a floating point representation of the input number. In converting these numbers from floating point format to log format, only operations on the mantissa M are required. The exponent figure LI, which is supplied by the output of leading digit detect 32, forms the integer portion of a logarithmic representation, hence the name LI. The mantissa M of the floating point representation is provided to a look up table 34 which performs the function of $(1+\log_2)$ of the input value. The output LF of table 34 forms the fractional portion of the base two log representation so that LI represents the integer bits and LF the fractional bits of the log representation.

Those skilled in the art will appreciate that the foregoing process is basically reversed in order to convert back from a base two log type format into a two's complement fixed point output or into such other data types as may be required at points in the circuitry. A look up table 35 which performs the function $2^{x-1}$ converts LF back into a floating point mantissa M, and a shift matrix 36 shifts the mantissa M by an amount represented by LI.

6.3 SCHEMATIC DIAGRAMS OF THE PREFERRED EMBODIMENT

In the preferred embodiment of the present invention, the above-described method for displaying sampled portions of stored keypoint data is performed by apparatus 40 as illustrated in FIG. 10. Referring now to FIG. 10, the system 40 employed in the preferred embodiment comprises a combination of components adapted for accessing keypoint data prestored on a video disc 41, to be retrieved by a video disc player 42 and processed by other circuitry to create a series of displayed images. The system 40 may be viewed as comprising two separate subsections, a processing unit 45 and a calculation unit 46. It should be understood, however, that these functional divisions are merely employed to ease the description of the circuitry employed, and are not limiting.

6 3.1 PROCESSING UNIT

The processing unit 45 includes the video disc player 42 and other subsystems necessary for controlling and accessing the video disc 41. Additionally, the processing unit includes a master controller 50 which controls the entire system. In particular in the preferred embodiment, the master controller 50 comprises a programmed microcomputer such as a type MC68020 32-bit microprocessor, configured to be operational with a conventional VME signal bus for communication with other system components. It is specifically contemplated in the present invention that the preferred embodiment will be employed in conjunction with a flight simulator, vehicle simulator, or other similar type of simulator apparatus which includes operator controls for simulating a realistic environment short of visual cues. The preferred embodiment of the present invention is specifically intended to provide those visual cues so as to provide an extremely realistic simulation. Accordingly, a host 51 provides signals indicative of operator input and external conditions. The host 51 may be one of a number of different types of simulator devices such as airplane simulators, which are well known to those skilled in the art and will not be described further herein.

The host 51, in response to operator input, provides parameters to the system 40 in the form of the variables (x,y,z, ROLL, PITCH, HEADING), all of which generally correspond to the variables described above with respect to the equations, except that PITCH corresponds to TILT and HEADING corresponds to PAN. These signals are provided on lines 52 as data inputs to the master controller 50. The master controller provides on lines 53 status information and synchronization (SYNC) signals for the host so that any controls or outputs in the host simulator may be coordinated with visual cues or conditions.

The master controller 50 is directly responsible for a number of functions, including but not limited to keypoint selection (see Section 6.1.3) and calculation of the frame rate constants (Equations 4–12). These frame rate constants are provided on lines 55 to the calculation unit 46. Additionally, a normalization variable NORM is computed and provided to the calculation unit 46, for use in generating sky portions of the displayed image.

The master controller 50 also computes frame rate constants for use in creating the haze overlay. The frame rate constants for this purpose are the variables ($f_1, f_2, f_3$). The variables RVRZ and HAZE COLOR, both of which relate to the haze overlay, are also provided. These frame rate constants pertaining to haze are provided on lines 56 to the calculation unit 46. The master controller also provides a signal on line 57 denominated SWAP, which is used for control of a double-buffered data memory in the calculation unit.

The master controller 50 is also responsible for primary control of the video disc player 42, through a video disc controller 60. The video disc controller 60 and video disc player 42 in the preferred embodiment comprise a conventional selectively addressable optically-readable laser disc player such as a type LD-V1000 manufactured by Pioneer Electronics (U.S.A.), Inc. As will be known to those skilled in the art, the disc 41 employed in the disc player is removable and replaceable. In conventional usage, video information is encoded on the disc and organized in a spiral track, and the portion of the track traversed in one revolution of the disc contains an FM-encoded video signal for one video frame, the video signal being in accordance with the television industry's standards such as NTSC. However, in the preferred embodiment the video disc player is employed as a mass data storage device rather than a video signal storage device, so that the encoding scheme employed is particularly adapted for optimizing data storage instead of optimizing video frame storage. It will however be understood that other digital data storage devices such as Winchester disks or digital optical discs can also be successfully employed in the present invention for storage of the keypoint image data.

The video disc controller 60 receives control signals from the master controller 50 via lines 61. The control signals provided comprise a signal denominated KEY-POINT NO. and START READ, which inform the controller as to the particular keypoint data which is to be selected and retrieved. At the appropriate time, the START READ signal is provided, as a function of synchronization signals, so that the data retrieved from the video disc will be routed to a selected data buffer. The controller 60 provides status information back to the controller on lines 62.

The video disc controller 60 is responsive to the KEYPOINT NO. and START READ signal to command the video disc player to select a particular track on the video disc. These command signals are provided on lines 63 as TRACK NO. and TRACK CMD., which are used to directly address a predetermined track on the video disc 41. The video disc player 42 provides status information as well as information pertaining to the track number read back to the controller 60 on lines 64. The structure and function of a video disc controller responsive to perform the foregoing functions is within the skill of the art, and will not be described herein.

The computation required to convert a keypoint number into a track number is a straightforward association of a predetermined number of tracks with a particular identifying keypoint number. In the preferred embodiment, each keypoint image requires 8 frames on a video disc. Each disc employed in the preferred embodiment contains about 54,000 conventionally encoded video frames. In the preferred embodiment, therefore, the video disc stores 6750 keypoints.

It should be further understood that the video disc system employed in the preferred embodiment has been modified in order to provide the capability to reliably jump a multiple number of track s radially on the video disc. These modifications are as described in our co-pending application Ser. No. 648,725, filed Sept. 7, 1984 and assigned to the same assignee as the present application. The disclosure contained in such copending application pertaining to the video disc player interface and modifications is incorporated herein by reference and made a part hereof; accordingly, no further discussion of these modifications will be provided herein.

It will also be appreciated that the LD-V1000-type video disc employed in the preferred embodiment provides as an output analog video signals which are corrupted by time base error. In addition, in the preferred embodiment the color values of the information are digitally encoded in a multiplexed analog component scheme described further hereinbelow. Accordingly, it will appreciated that the preferred embodiment includes a time base correction circuit (not illustrated), the construction of which will be known to those skilled in the art, as well as conventional video speed analog-to-digital converters which collectively provide time base corrected digitized signals to a color demodulator 66.

It will be appreciated that the video disc player 42 and video disc controller 60 employed in the preferred embodiment provide the ability to effectuate a jump of tracks between frames at least as great as 100 tracks both forward and backward in increments of one track. In the modified video disc player, transfer of eight frames to the keypoint data memory 70 requires approximately 4/15 second, as the videodisc frame rate is 30 Hz. Accordingly, it will be appreciated that as long as data from the next keypoint is not required for more than 4/15 second and the next keypoint is within the videodisc player jump range, the modified video disc structure described in the referenced copending application will operate with satisfactory speed of accessing.

Accordingly, the output of the video disc player 42 is a signal denominated DIGITIZED VIDEO which is provided to a demodulator circuit 66. In the preferred embodiment, the pixel data is stored in a modified multiplexed analog component ("MAC") system somewhat different than NTSC encoding. The multiplexed analog component scheme employed in the preferred embodiment uses a color matrix approach similar to NTSC, except that the red, blue, and green components are represented by components Y, U, and K instead of Y, I, and Q. The Y component corresponds to the luminance Y as in NTSC, but the matrix components U and K represent different proportions of R, G and B designed to improve the signal-to-noise ratio of the retrieved keypoint data.

The output of the MAC demodulator 66 comprises twenty-four-bit keypoint pixel data encoded as Y, U, and K, at eight bits each. These signals are provided on lines 67 to the calculation unit 46 as signals (Y, U, K PIXELS). These signals are transformed in the manner as will be described in connection with the calculation unit to transform the pixel signals into RGB information for display.

Also included in the processing unit 45 is a master synchronization generator 68 which provides synchronization signals to the various circuit components, including the video disc player and the CRT display. Master synchronization generator 68 generates synchronization signals which are employed by the video disc player, which includes a servomechanism designed to maintain the rotation of the video disc at a predetermined speed, so that data being provided from the video disc player will be synchronized to signals in the master synchronization generator. In addition, signals from the master synchronization generator 68 drive the CRT. Still further, the master synchronization generator 68 provides clock and other timing signals which are employed throughout the entire system to ensure synchronous operation.

In order to display the color image information on a color CRT, horizontal and vertical synchronization signals must be generated to drive the CRT. The construction of circuitry responsive to synchronization signals from the master sync generator for coordinating the storage of pixel data in a digital memory, and for generating horizontal and vertical sync signals for a raster scanned CRT, is within the skill of the art, and will not be discussed further herein.

The master controller 50 also provides a signal denominated SWAP on line 57 to the calculation unit, which is employed to switch between the two frame buffers, as will be described below.

6.3.2 CALCULATION UNIT

Also illustrated in FIG. 10 is a calculation unit 46 which receives signals from the processing unit 45. The calculation unit is primarily responsible for storing the Y, U, K pixel data in a double-buffered memory, and for generating addresses into this memory to select and retrieve pixel data for display. Accordingly, the calculation unit 46 comprises a keypoint data memory 70, which is a double-buffered addressable random access memory. The keypoint data memory includes a first buffer BUFFER 1 and a second buffer BUFFER 2 which are connected in a conventional double-buffering fashion. An input multiplexer 72 responsive to the SWAP signal on line 57 from the processing unit controls which of the two buffers will be employed to store the next set of keypoint pixel data. A similar output multiplexer 73 selects retrieved data from one of the buffers and provides output pixel data on lines 74, which comprises four adjacent Y, U, K pixels provided to an antialiasing circuit 75.

The two addressable data memories BUFFER 1 and BUFFER 2 are addressed by two different signals emanating from keypoint address generator 80: an input address for storage of data provided on lines 67, and an output address for retrieval of information from the other buffer. The output addresses are denominated by the signals MJ,MK OUTPUT ADDR., while the input addresses are denominated by INPUT ADDR. These address signals are provided from a keypoint address generator 80, which will be described in greater detail below. It will be understood by those skilled in the art that the INPUT ADDR. is employed for storage of data in a first one of the buffers, while simultaneously the output address signals MJ,MK OUTPUT ADDR. are employed on the other buffer to select calculated locations in the buffer for retrieval of previously stored data.

In the preferred embodiment, each of the buffers comprise a 24 bit word by approximately 1 megaword of randomly addressable memory (RAM) constructed and employing conventional memory management techniques known to those skilled in the art.

The keypoint address generator 80, in addition to providing the addressing information for the keypoint data memory 70, provides signals which are employed by the antialiasing circuit 75 to effectuate the filtering described above. It will be recalled from the preceding discussion that color data corresponding to four adjacent pixels are provided for each output pixel to be displayed. The color values of these pixels as well as the fractional or subpixel parts of MJ,MK must be known by the antialiasing circuit 75 to perform its function. Thus, subpixel address information in the form of signals on line 81 as SUBPIXEL ADDR. are provided. These signals correspond to the values of P and Q discussed above in connection with FIGS. 8 and 9. The subpixel address corresponds to the fractional portion of the $(U_0, V_0)$ address, while the integer portion of these addresses corresponds to the physical address in memory. Accordingly, it will be understood that the values of P and Q then represent the fractional components of these addresses, which are employed by the antialiasing circuit to obtain the color value for the resultant displayed pixel R (FIG. 9) for the display screen. It will therefore be understood that MJ and MK are the addresses in keypoint data memory 70 of an actual stored pixel. Only the fractional subpixel address portion SUBPIXEL ADDR. is provided to the antialiasing circuit on lines 81 and employed therein.

In response to the SUBPIXEL ADDR. on lines 81, and the four adjacent Y, U, K pixels on line 74, the antialiasing circuit 75 derives data corresponding to a single pixel R which is provided as an output on line 83 to a haze overlay circuit 90. The haze overlay 90 computes Equations 21-23 discussed hereinabove, and as will be described in greater detail below. The haze overlay circuit 90 receives the frame rate constants ($f_1$, $f_2$, $f_3$), RVRZ, and HAZE COLOR on lines 56 from the master controller, which are required in order to generate the haze.

Finally, the output of the haze overlay circuit 90 is RGB information provided on lines 92 to a conventional color CRT monitor 94, which displays the generated image.

6.3.3 KEYPOINT ADDRESS GENERATOR

FIG. 13 illustrates in more detail the keypoint address generator 80 which is employed to calculate the addresses MJ and MK. This circuit comprises a plurality of row/column multipliers 100a, 100b, 100c which are responsive to the frame rate constants a1, a2 ... c3 to compute the numbers A, B, C which are in turn provided as inputs to other portions of the address generator. Each of the row/column multipliers 100 are similarly constructed, as will be discussed in greater detail below in connection with FIG. 17. It will be recalled that the raster-scan screen pixels, represented by the variables (u,v), are simple integer counts ( ... −2, −1, 0, 1, 2, 3 ... ). Because of the fact that screen pixel addresses are incremented across a line in integers, and line numbers are incremented in integral units, the computation of A, B, and C can be formed by an arrangement of adders to implement the Equations 1, 2, and 3. For example, the number A can be found by adding a2 to a3 "v" times and then adding the constant a1 "u" times. It will be understood by those skilled in the art that this method will have a cumulative error effect due to the repetitive additions, so more bits of precision are required than an approach that directly multiplies the frame rate constants and the variables (u,v) directly.

It will accordingly be understood that each of the row/column multipliers 100a, 100b, 100c receives a corresponding set of frame rate constants, depending upon which of the values A, B, or C is to be computed. The row/column multiplier further receives synchronization signals on lines 101 from the master sync generator 68 (FIG. 10) to perform these calculations.

The outputs of the row/column multipliers 100 are provided to address calculation units identified as the $U_0$/MJ unit and $V_0$/MK unit, identified by the reference numerals 103 and 104, respectively. The $U_0$/MJ unit 103 receives the calculated values A and B, and produces the output address MJ, while the $V_0$/MK unit 104 receives the calculated value C, plus certain intermediate results on lines 105 from the $U_0$/MJ unit 103, and provides the output address MK. Both the MJ and MK output addresses are 20 bit digital addresses, the upper twelve bits of which comprise the keypoint pixel address MJ, MK OUTPUT ADDR., employed to address the keypoint data memory 70, and the lower eight bits of
rise the address signals SUBPIXEL ADDR. used by the antialiasing circuit 75. The signals MJ, MK OUTPUT ADDR. are employed to address the keypoint data memory 70. As will be discussed further below, certain intermediate computations are common to the calculation of both output addresses MJ and MK; in the preferred embodiment, these intermediate values, denominated DIV, BL, AL, BEQA, and BGTA, are computed in the $U_0$/MJ unit 103 and then provided as inputs to the $V_0$/MK unit 104.

It has been discovered that the intermediate value C is a very good approximation of elevation angle for a relatively limited field of view. The sign of the value of C may be used to determine whether the displayed region on the screen is sky or not sky. Accordingly, the preferred embodiment of the present invention includes a sky generator circuit 110 which is employed to generate keypoint memory addresses for portions of the image above the horizon line. The sky generator 110 calculates the portions of Equation 17 corresponding to SKY, which constitute the terms in the equation associated with the logical variable $\overline{SC}$ and are provided as digital signals on lines 112. The inputs to the sky generator 110 are NORM (from the master controller 50 in FIG. 10), CM (the mantissa of the value C computed by the row/column multiplier 100c), and CLI (the exponent of this same value C). The latter two values are found as by-products of calculations done in the $V_0$/MK unit 104.

Still referring to FIG. 13, it will be noted that the sign of C (SC) selects between the TK output of the $V_0$/MK unit 104 on lines 106 or the SKY signal on lines 112, to provide the output address MK. This selection is performed by a sky/terrain selector comprising a data selector/multiplexer 115, which is responsive to select either the output of the $V_0$/MK unit on lines 106 or the SKY signals on lines 112.

A lookup table of data corresponding to the color of the sky for a given value of C is used to produce sky portions of a displayed image. This table of sky colors is created separately from terrain portions, and is stored in a predetermined portion of the keypoint data memory 70. Specifically, the sky information is stored in the keypoint data memory as a result of the computation of a table of data consisting of colors, for example, gradually changing from a light shade of blue corresponding to the color of the sky at the horizon when the magnitude of C is small, to deeper shades of blue corresponding to the zenith overhead where the magnitude of C is large. By examining Equation 17, it will be appreciated that the value of C is used to address a block of memory in the keypoint data memory that contains Y, U, K data for a sky blue color. In other words, there is a predefined block of memory in the keypoint data memory which serves as a look up table addressed by the value of C. In the preferred embodiment, a 128 by 128 pixel block of memory is repetitively and redundantly decoded to appear above the horizon across the whole width of the keypoint. The values stored in this block are identical for fixed values of MJ, and only show variation in the MK direction. Therefore, 128 values of sky color may be stored, corresponding to MEM-SKY=127. Since the block is repeated across the entire horizon, and the block's data changes only with MK, the MJ portion of the address calculation does not affect the sky portion of the image.

The sky generator 110 is further responsive to a signal denominated NORM provided on one of the lines 55 from the master controller 50. In calculating A, B, and C with the row/column multipliers 100, the usable precision in these devices has been optimized by multiplying by the frame rate constants (a1, a2 ... c3) by normalizing factor, ($\frac{1}{2}^{NORM}$). However, the sky generator 110 must have the value of C without normalization applied, so "denormalizing" must be done. This is provided by multiplying the output of the row/column multiplier 100c by the factor $2^{NORM}$.

The variable NORM is an integer. It will be appreciated that choosing such integer values causes the scaling of C by an amount which is a power of 2, where NORM is a function of the exponent, to form the address SKY without the need for a hardware multiplier. Those skilled in the art will understand that this scaling operation is equivalent to a binary shift operation. In the preferred embodiment, the number C has been converted from a 32 bit fixed point to a log data type. The shift is easiest to implement in a floating point data type, where C equals the mantissa of C, times two raised to the power of an exponent. Accordingly, it will be understood that the sky generator 110 comprises merely an adder and a small shift matrix.

Finally, the keypoint address generator 80 includes input address counters 114 which are used to generate the INPUT ADDR. for addressing the keypoint data memory 70 when data is to be loaded from the video disc. The only inputs to these input address counters 114 are synchronization signals provided on lines 101 which signal the counter circuit at horizontal line intervals and frame intervals from the video disc controller, and the SWAP signal on line 57 which resets the counters to an initial starting address preparatory to loading a new set of keypoint data. Construction of such counters for generating input addresses is within the skill of the art.

6.3.3.1 $U_0$/MJ UNIT

FIG. 14 illustrates the construction of the $U_0$/MJ address calculation unit 103 shown in FIG. 13. The $U_0$/MJ unit 103 is responsive to the computed values of A and B to provide an output address MJ. The computed value A is provided first to a converter block 131 which converts the fixed-point representation of A into a logarithmic representation of its absolute value denominated AL, and a sign indicator for A designated SA. Similarly, a fixed-to-log converter block 132 converts B into a logarithmic representation BL and a sign indicator SB. Both AL and BL are provided to a comparator 133 which tests if B is greater than $|A|$, or $|B|$ equals $|A|$. The comparator is a conventional digital comparator constructed with conventional parallel comparator circuits. The results of the comparison provide the signal BGTA, a logical signal which is true when $|B|$ is greater than $|A|$, and BEQA, a logical signal which is true when $|B|$ equals $|A|$. These are a part of the intermediate results provided on lines 105 to the $V_0$/MK unit. It will also be noted that the logarithmic representations of AL and BL constitute part of the intermediate results.

The signs of A and B are also provided from the fixed-to-log converters 131, 132, and constitute the signals SA, SB. Each of these signals SA, SB, BGTA, BEQA provide inputs to a control logic block 134 which is responsive to provide the output signal SOFF, S90, S180, SOUT1 and SOUT2. The control logic block 134 performs the functions set forth in Table II, as discussed above.

The primary arithmetical operation performed on A and B is a divisional operation, which is implemented as a subtraction operation on logarithms carried out to satisfy Equation 13. This is performed by an arithmetic logic unit (ALU) 136, which subtracts AL from BL, or alternatively, BL from AL, depending upon the logical control signal SDIV. The output of the ALU 136 is the division result DL, which is provided to a logarithmic-to-floating point converter 137, which converts the division result into a floating point representation. This floating point representation, represented by a mantissa portion DM and an exponential portion DE, is then converted back into fixed point representation by a floating point-to-fixed converter 138, which forms the division result signal DIV.

The DIV signal is provided as an input address into an arctan look up table 140, which provides the arctangent result also required in implementing Equation 13, and is provided as an intermediate result on lines 105. The output of the arctan look up table 140 is the signal ALUT, and is one input to a second arithmetic logic unit 141. The ALU 141 adds the offset value OFT to the arctan calculation performed by the look up table 140, in implementing Equation 15. Thus, the other input to the ALU 141 is the signal OFT, which is the output of an offset look up table 143 which is the result of the offset computation formed again in the manner as set forth in Table II in response to the signals SOFF, S90, S180, SOUT1, and SOUT2. It will be understood from an analysis of Equations 13, 15 and 16 that the output signal OFT is the result of the computation of Equation 16, which includes the offset factor MEMJ The logical conditions SOUT1 and SOUT2 control the ALU 141 so as to determine whether the ALU provides as the output signal MJ the value of OFT only, or the sum or difference of OFT and the arctan table results. The output of the ALU 141 is a 20-bit memory address MJ. Twelve of the 20 bits of the address MJ are provided to the keypoint address memory, while eight of the 20 bits comprise one portion of the SUBPIXEL ADDR. provided to the antialiasing circuit on lines 81.

6.3.3.2 $V_0$/MK UNIT

FIG. 15 illustrates the $V_0$/MK unit 104 which forms the other portion MK of the keypoint address. The $V_0$/MK unit 104 is responsive to the intermediate results provided on lines 105 as well as to the calculated value of C. It will be understood that the circuitry in FIG. 15 is responsive to compute Equations 14 and 17. The pixel rate occurring value of C is provided first to a fixed-log converter block 151, which converts the fixed-point representation of C into a logarithmic representation CL of its absolute value, plus a signal SC which is used in the manner described above in connection with the data types employed in the preferred embodiment. Also as described above, the fixed-to-log converter 151 forms and provides the floating point representation of C as the signals CM and CLI for use by the sky generator.

Note also in Equation 14 the requirement for computing the log of cosine of arctan of the result of MJ's division computation, which is represented by the signal DIV. Thus, the signal DIV is provided as an address to a CTAN look up table 152, where CTAN(x)=1++log$_2$[cos (arctan (x))], which also receives the logical signal BEQA. The output of the CTAN look up table 152 in the preferred embodiment is the signal CLUT. The signals CLUT and CL are then added with an ALU 153 to form the signal MPYC, set forth in Equation 14. Then, the value of MPYC is compared with the value AB at comparator 156, which represents the results of selection of the larger of AL or BL, depending on the value of the logical variable BGTA . BGTA controls a multiplexer/data selector switch 154 to choose either BL or AL to form AB. Comparator 156 compares the values of AB and MPYC and provides the logical control signal REQ if the values are equal, and the logical control signal RINV when MPYC is greater than the larger of the absolute value of A or B, all as set forth in connection with Equation 14.

In response to RINV, an arithmetic logic unit 158 subtracts MPYC from AB, or the inverse, as shown in Equation 14 to provide the output signal RL which is first converted to fixed point from logarithmic data type RP by a log-to-fixed converter 159, and then used as the input address to a look up table 160 which computes the function T(x). The function T(x) is the result of the calculation of $V_{0max} * ((1-RP)/(1+RP))$, as set forth in Equation 14, which is most conveniently calculated by a look up table as opposed to discrete computational hardware.

The output of the T(x) look up table 160, the signal TR provided on line 161, goes to an ALU circuit 162, The ALU circuit 162 is responsive to the REQ and RINV signals from comparator 156, and the memory offset MEMK, which is provided by a set of presettable switches (not shown) which are set during system configuration. The output of ALU circuit 162 is the signal TK, which comprises a 12-bit integer portion on lines 106 prior to addition of the SKY terms, and an 8-bit fractional subpixel portion on lines 81 as a part of the SUBPIXEL ADDR.

6.3.3.3 SKY GENERATOR CIRCUIT

Also forming a part of the keypoint address generator 80 is a sky generator 110, illustrated in more detail in FIG. 16. The sky generator 110 creates addresses for the sky portion of the keypoint data memory 70 (FIG. 10). These addresses form a number which is proportional to the direct value of C, in accordance with the portion of Equation 17 associated with $\overline{SC}$. The sky generator receives the base two floating point mantissa and exponent of the normalized value C, called CM and CLI, respectively, computed by the $V_0$/MK unit 104 shown in FIG. 13. This floating point form of C must be "denormalized" by multiplication with the value $2^{NORM}$ and then converted to fixed-point format to form the SKY address on lines 112. The multiplication is done by adding the five bit value NORM, received from the master controller 50 (FIG. 10) to CLI using an adder 166. Adder 166 in the preferred embodiment is a conventional digital adder such as an arithmetic logic unit of a type 74F283 four bit binary adder manufactured by Fairchild Semiconductor. After the addition of NORM and CLI, the output of adder 166 is provided on lines 165 as the signal SHIFT AMOUNT, which is employed to shift the mantissa CM to convert to fixed-point format. In order to effectuate this function, the mantissa CM is shifted by a shift matrix 167 by the amount of the exponent found on lines 165. The resulting number, which is provided as the output of the shift matrix 167, forms the sky address SKY on lines 112, which is sent to the terrain/sky selector 115 (FIG. 13).

6.3.4 ROW/COLUMN MULTIPLIER CIRCUIT

It may be recalled from the discussion above that in the preferred embodiment three intermediate variables A, B, and C are computed at pixel rates, according to Equations 1, 2, and 3. The values of these variables are computed by three identical row/column multiplier circuits 100a, 100b, 100c (FIG. 13) and provided to the $U_0$/MJ unit 103 and the $V_0$/MK unit 104. It should be understood that the multiplier circuit 100 (FIG. 17) is merely exemplary, and that the same circuit is used to compute the values A, B, and C, as well as the value of the variable F in the haze overlay circuit. It should also be noted that the function of the row/column multiplier may also be accomplished by other means and the means presented below represent that used in the preferred embodiment. An example of another means would be to implement Equations 1, 2, 3 directly using multipliers and adders. This may be impractical for row/column multiply operations of high precision due to the cost and speed limitations of existing wide-word multipliers.

The purpose of a row/column multiplier 100 is to compute the result of the general expression $$(a1 * u) + (a2 * v) + a3$$

where a1, a2, a3 are constants that are updated at frame rate, u is an integer count that increases at pixel rate from zero at the beginning of each output image line (0, 1, 2, 3 . . . ) and v is an integer count that increases at line rate from zero at the beginning of each output image field. The frame rate constants a1, a2, a3 are supplied by an external source such as the master controller 50. The values u and v are supplied indirectly in the form of sync signals 101, comprising VSYNC, VBLANK, HSYNC, HBLANK and SCK from the master sync generator 68.

These sync signals are those used by the color CRT 94 to help in forming the output images, and are well known to those skilled in the art. HBLANK is true during the time used for horizontal retrace between each horizontal line of the image, and false during the time the active picture is being traced on the screen. HSYNC is used for synchronization of the horizontal deflection circuitry for the color CRT 94, and is true for a short time within the time that BBLANK is true. VBLANK is true during the time used for vertical retrace between each field or frame of the image, and false during the time the active picture is being traced on the screen, and VSYNC is used for synchronization of the vertical deflection circuitry for the color CRT 94, and is true only for a short time within the time that VBLANK is true. SCK, the system clock, is the continuous clock signal with rising edge transitions at pixel rate from which all other master sync signals are derived.

The u and v values are derived indirectly from the sync signals just described. Since u represents the horizontal position or pixel number, and v represents the vertical position or scan-line number for a given output pixel, then u is simply the number of system clock (SCK) cycles that have occurred since the most recent transition of HBLANK from true to false, and v is the number of HSYNC signal pulses that have occurred since the last true to false transition of VBLANK.

In FIG. 17, rather than use multipliers, the row/column multiplier circuit 100 calculates A, B, C by repetitive adds of the frame rate constants a1, a2, a3, which can be accomplished by proper manipulation of the control signals VCK, HCK, VSEL and HSEL, such as one described in the exemplary sequence below. Adders 171, 177, preferably a type 74F381 made by Texas Instruments, are employed to make these repetitive adds. The frame rate constants, such as (a1, a2, a3) are received and held in parallel registers 170a, 170b, 170c from an external source such as the master controller 50 and loaded at the appropriate time by LOAD signals provided by the originating circuit. In the preferred embodiment, registers 170 are type 74F374 manufactured by Texas Instruments. The output of register 170c thus supplies the value a3 to the D2 input of the data selector 176a, whose output to register 176b is equal to either the D1 or D2 input depending on the select input signal VSEL, supplied by control logic 175. The data selector 176a and register 176b in the preferred embodiment is a Texas Instruments type 74F298 circuit, shown at 176.

When VSEL is set to select D2, then a3 appears at selector 176a output OUT, and if register 176b is then clocked by the signal VCK, a3 appears at the output of register 176b. Data selector 173a then receives the output of register 176b, which is now in this case the value a3, and when HCK signal is activated, the register 173b is loaded with the value supplied by data selector 173a and this value appears at its output, which is in this case a3. Thus, by following this procedure, the output value A is caused to have the value a3.

With the hardware of FIG. 17 in this state, consider register 176b, which now contains a3. If the selector 176a is caused to select its D1 input by the VSEL signal, its output will be the sum of a2 and the output of register 176b, which is at the moment equal to a3. If the VCK signal is activated, the input to selector 176a is loaded into the register, forcing its output to be $a_2+a_3$. If the VCK signal is then activated repeatedly, for example, for "V" times, the output of the register 176 will then be (v * $a_2$)+$a_3$. If the data selector 173a is then caused to select the input D2 via the signal HSEL, the output of the register 176b will appear at the input to register 173b, which in this example has the value (v * $a_2$)+$a_3$. Activating the signal HCK then loads this value into register 173b. Causing the data selector 173a to select its D1 input via HSEL will then cause the value al+(v * a2)+a3 to appear at the input to register 173b, and activating the signal HCK then loads this value and causes it to appear at the output of register 173b in a manner similar to that of the preceding stage. Activating HCK "u" number of times in this configuration will cause the output of 100 to be:

(u * a1)+(v * a2)+a3.

This generation of the proper sequence of the control signals can cause the described hardware 100 of the preferred embodiment to calculate the results of Equations 1, 2, 3, and these control signals are produced by the control logic 175.

The control logic 175 includes a state machine 178, which is illustrated in FIG. 18. Inasmuch as construction of a state machine as illustrated in FIG. 18 is within the abilities of the skilled artisan, especially after the above discussion, further discussion of same will not be provided herein.

6.3.5 HAZE OVERLAY CIRCUIT

FIG. 19 illustrates in more particular detail the haze overlay circuit 90 which implements the haze overlay Equations 21-23, and converts the output of the antialiasing circuit into RGB values for display on the CRT. The haze overlay circuit is responsive to several frame rate parameters, including the runway visual range value RVRZ, the haze frame rate constants ($f_1$, $f_2$, $f_3$) represented by Equations 18, 19, and 20, respectively, and the HAZE COLOR signal. The RVRZ signal is provided to a storage register 190, and loaded by a load signal LOAD RVRZ provided from the master controller 50. Similarly, the HAZE COLOR data is loaded into a register 191 from the master controller and loaded with a load signal LOAD HAZE, also provided from the master controller. The parameters ($f_1$, $f_2$, $f_3$) are provided to a row/column multiplier circuit 100d, constructed in the manner described in connection with FIGS. 17 and 18. It will be appreciated that the row/column multiplier circuit 100d carries out the Equation 21 at pixel and line rates.

The output of the row/column multiplier 100d is the signal F. It will be recalled that the signal F corresponds to the angle to the horizon of a point on the output image. The value of F from the row/column multiplier 100d is applied as an address input to a sine look up table 193, which computes the sine of F for use in Equation 22. This output is provided on line 194 to the input of a multiplying circuit 195, which multiplies the (sin F) times the value of RVRZ. In the preferred embodiment, multiplier 195 is 16×16 bit parallel digital multiplier, such as a type MPY016K manufactured by TRW, Inc., La Jolla, Calif. The remainder of Equation 22 is performed through a power function look up table 196 which computes (0.02) to the power of (1/(RVRZ * (sin F)), all as shown in Equation 22.

The output of the power look up table 96 is denominated as signal HF, which may be considered a "haze factor" ranging from 0 to 1. Accordingly, the HF signal is multiplied by the RGB terrain or sky data, denominated TERR/SKY, from a Y,U,K to R,G,B converter 205, by a multiplier 203. Conversion of Y, U, K to RGB constitutes a linear or matrix transformation which can be efficiently accomplished through an arrangement of look up tables and adders which receive as their inputs the values of Y, U, K and provide as their outputs R, G, and B pixel values, each in 8-bit resolution. As such transforms are known to those skilled in the art, no further description will be provided here. The output of the converter 205 comprises the terrain or sky data signal TERR/SKY, which constitutes terrain or sky data for display.

A subtracter circuit 201 comprising an ALU configured to subtract HF from the number "1" is used to calculate (1—HF), which is then provided on line 202 to the input of a multiplier 207 whose other input is the 24 bit signal HAZE, which is the HAZE COLOR signal stored in a register 191. The output of the multiplier 203 is then additively combined at an adder 206 with the output of a multiplier 207. Multiplier 207 multiplies the haze color represented by the signal HAZE, provided from the register 191, by the complement of the weighting of the terrain/sky signal TERR/SKY. The output of adder 206 thus forms a weighted average between the haze color and the TERR/SKY signal. This weighted average is a function of translucency of the haze over the terrain and sky and is implemented b y adjusting the relative proportions of haze to terrain or sky so that a variable haze color with a variable translucency may be imposed on the scene. The signal HF, which varies between 0 and 1, can be thought of as the degree of translucency of the haze, with HF=0 corresponding to opaque haze, which is very dense fog, and HF=1 corresponding to no haze or absolutely transparent haze, that is, perfectly clear weather.

It will by now be appreciated that the output of the adder 206 is the resultant RGB value for display, including a haze overlay as may be selected as to color by HAZE COLOR and as to density by runway visible range RVRZ, denominated the OUT signal as computed in accordance with Equation 23. The OUT RGB values are then provided to digital-to-analog converters 210 for conversion to RGB analog signals which can then be displayed on the CRT.

6.4 DATA PRECISION CONSIDERATIONS

Precision of the keypoint address generator 80 is important to the reliable and satisfactory operation of the preferred embodiment of the present invention.

Errors of as little as one-half pixel may cause serious shifts in output imagery, with resultant discontinuities or regions of unconvincing realism.

The preceding discussion has primarily focused on the manner of computing the various parameters required to generate the images, of course assuming that keypoint images have been prestored on video discs as source material. In implementing the preferred embodiment, the skilled artisan must be assured that the keypoint address generator will perform its calculations with sufficient precision to prevent significant errors in its output. Each functional block described hereinabove primarily executes a single mathematically defined function, and for the most part these functions have a limited set of inputs and a single output. The functional blocks are connected together with parallel signal paths to form a circuit from the master controller 50 and video disc to the MJ/MK memory address outputs. The error at the output will then be the result of errors within each block, plus any quantizing errors imposed by the finite widths of the digital signal paths that connect these blocks.

In the preferred embodiment, it is specified that the output of each block have no more than one-half of the least significant bit error at its output, to limit the error introduced by the block itself. The maximum quantizing error of the input is preferably small enough so that it will cause no more than one-half a bit change in the output. This sets a limit on the error introduced by the input signal path width, and in turn the precision of the output of the block before it, and so on up the data flow path.

If the function of a block is executed as a look up table, then the values stored in the table are the result of the function calculated to higher precision, and rounded down to the precision required at the output. If the block represents an arithmetic function such as addition, it is preferred that the block not provide any error in the output with respect to its quantized inputs. The foregoing considerations allow definition of the data path widths between blocks.

Attention will now be directed to the data precision considerations of the preferred embodiment described herein, so as to ease the construction thereof by the skilled artisan. It will be understood that these precision considerations are best viewed by following the data flow paths upstream from the $U_O$/MJ unit 103 and the $V_O$/MK unit 104. First, consideration will be given to the MJ output address from the $U_O$/MJ unit 103 (FIG. 14). In the preferred embodiment, the full extent of the address MJ contains 1920 pixels, each broken into 32 subpixel positions. This corresponds to 61,440 data points across the keypoint image in the MJ direction. It will be appreciated that this can be represented by 16 bits of information. In the preferred embodiment, a total of 20 bits is employed for the MJ address, with 12 bits corresponding to an integer pixel address and 8 bits corresponding to the fraction or subpixel address.

Upstream of the ALU 141 that forms the address MJ are three signal paths: OFT, ALUT, and various control lines. It will be understood that ALUT includes the arctan function, which possesses eight-fold symmetry. ALUT represents a scaled angle between 0 and 45 degrees. Since an arithmetic logic unit such as ALU 141 does not change precision, the precision upstream of ALU 141 must match the precision downstream. Accordingly, the precision of the signal OFT must be maintained at the required output precision of at least 16 bits, and 20 bits are used in the preferred embodiment. However, the signal ALUT can possess three less bits precision because of the eight-fold symmetry, and can be represented with 13 bits precision. Therefore, the signal paths to the ALU 141 are 20 bits for OFT, and 16 bits from the output of the arctan look up table 140.

The input to the arctan look up table 140 is an unsigned fixed-point signal DIV on the output of the floating point-to-fixed converter 138. A 14 bit number is used to represent this data path. Accordingly, it will be understood that the arctan look up table 140 is preferably 16K by 16 bits in the preferred embodiment. The float-to-fixed converter block 138 that creates the DIV data takes the mantissa DM of the input from the log-to-floating point converter 137, and shifts it by the amount of the exponent DE. Accordingly, in the preferred embodiment a 16 bit shifter is employed as the shift matrix (see FIG. 20) in the float-to-fixed conversion block 138 to implement the conversion. The exponential portion DE of the floating point representation of the signal DL forming the input to the converter 138 is set in the preferred embodiment at 4 bits, since shifting the mantissa more than 14 bits will not cause a significant change in DIV.

The log-float converter block 137 converts the log format signal DL to form the floating point format mantissa signal DM and its corresponding exponent portion DE. In the preferred embodiment, a 16 bit number is used as the input to the look up table employed in converter 137, as further explained in connection with FIG. 20. The look up table in the preferred embodiment is a 64K by 16 bit look up table.

The ALU 136, it will be recalled, performs a subtract operation on the logarithmic signal AL and BL. The output of this operation has precision no greater than that of its least precise input, so AL and BL must at least have the precision of DL. Theoretically, either A or B can have a value of zero, and in logarithmic format this represents values of negative infinity. In the preferred embodiment, rather than representing zero logarithmically, a minimum acceptable value which approximates zero is employed, where the difference results in a less than one-half least significant bit change in the output. Thus, provision of precision sufficient to provide for these minimums, while somewhat excessive, will provide a suitable approximation of zero. In the preferred embodiment, the minimum data path width provided is a 5 bit integer, 16 bit fractional representation, so as to provide a sufficient precision. In the preferred embodiment, therefore, the ALU 136 must be at least 21 bits wide, but only the 20 most significant bits are used to form DL.

The fixed-to-log converter block 131 which forms the signal AL converts the fixed point format of A to a log format AL. Similarly, the fixed-to-log converter block 132 performs the same function for the signal B. As shown in FIG. 20, the fixed-to-log converter includes a shift matrix and a look up table for the mantissa. In the preferred embodiment, both AL and BL are represented by a 16 bit fractional portion and a 5 bit integer portion. Therefore, the fixed-log converters 131 and 132 employ a 64K by 16 bit mantissa look up table. Additionally, one bit is provided as a sign bit, and a 31 bit in/16 bit out shift matrix (shown at 33 in FIG. 20) is provided.

The row/column multipliers 100 in FIG. 17 that calculate A, B, and C incrementally in the preferred embodiment have a 5 bit integer portion and a 27 bit fractional portion. It will be recalled that the inputs to the row/column multipliers are small numbers added repeatedly to form larger numbers which are the 32 bit outputs of the multiplier circuits. For the number of scan lines (480) and pixels per line (754) in the preferred embodiment, which are represented by the range of (u,v), 24 bits is adequate for frame rate constants a1, a2, b1, and b2. For the coefficients a3 and b3, a 32 bit data path is employed to allow for the worst case possibility that a3 and b3 alone must represent the signals at the limits of A and B.

Turning next to a consideration of the precision for the MK address signal provided from the output of the $V_O$/MK unit 104 (FIG. 15), a similar approach as that taken in computing the precision for MJ is employed. In the preferred embodiment, the full extent of MK in the keypoint image comprises 384 pixels, each broken into 32 subpixel positions. This corresponds to a minimum required precision of 14 bits, but in the preferred embodiment a 12 bit integer and an 8 bit fraction are employed, for a total of 20 bits.

The MK address, it will be recalled, is either the TK output on lines 106 of the $V_O$/MK unit 104, or the SKY signal on line 112 from the sky generator 110 (FIG. 13). Accordingly, each of these must have the full precision of the MK output. In actuality, the SKY signal requires fewer bits since it is addressing a look up table region within the keypoint data memory which has less resolution than the terrain data, since sky data is more homogeneous and contains little detail. Accordingly, in the preferred embodiment the SKY signal is represented by a 10 bit integer portion and a 6 bit fractional portion.

Referring again to FIG. 15, precision requirements upwards of the TK data path will be considered. The ALU 162 forms the signal TK by adding or subtracting a constant memory offset MEMK to the signal TR provided on lines 161 from the output of the T(x) look up table 160. The RINV signal selects between adding and subtracting, and can be thought of as a SIGN bit being appended to TR, so that TR requires one less bit of precision. The offset MEMK has the full precision of TK. In the preferred embodiment, the memory offset MEMK is represented by a 10 bit integer portion and a 6 bit fractional portion, while the signal TR is represented by a 10 bit integer portion and a 6 bit fraction portion, both having a total of 16 bits. The look up table 160 forms the unsigned value TR from the unsigned value RP.

Because of the symmetrical nature and gentle slope of the T(x) look up table 160, the input signal RP need only be 14 bits in order to maintain a sixteen bit output precision. However, the fixed-point value RP represents a number between 0 and 1. This number is computed from two log format numbers provided to ALU 158. Thus, the output of ALU 158 must be converted to the fixed-point data type for use as the input to the T(x) look up table 160. Accordingly, it will be appreciated that the input signal RL to the log-to-fixed converter 159 is 20 bits provided from the output of ALU 158.

The signal RL is the output of the ALU 158. This signal represents the integer and fractional parts of the difference between AB and MPYC. Again, since the results of addition or subtraction have no more precision than their least precise input, the signals AB and MPYC have the precision required for the output signal RL. In the preferred embodiment, the signal MPYC is represented by a 5 bit integer portion and a 16 bit fractional portion, for a total of 21 bits. AB is simply a selection between 20 bit numbers AL and BL.

Tracing up the MPYC data path in FIG. 15, it is seen that this signal is formed from the output of a ALU 153, which adds the logarithmic representation of CLUT to the logarithmic absolute value of C represented by CL. In the preferred embodiment, CLUT is represented by a 1 bit integer and a 15 bit fraction. Tracing up the CLUT data path, it will be seen that this signal is provided from the output of the CTAN look up table 152. It will be recalled that this is formed from the signal DIV, having 14 bits. The precision requirements in the $U_O$/MJ unit 103 have set the precision of DIV to a 14 bit fraction. This is sufficient for the CTAN look up table 152.

The next precision consideration is the precision of the signal CL, forming the other input to the ALU 153. This signal it will be recalled is the logarithmic representation of the value C formed by row/column multiplier 100c (FIG. 13). In order to obtain this logarithmic representation, the results of the computation to form the signal C are passed through the fixed-to-log converter 151. In order to maintain the same degree of precision as the output signal MPYC, which is 20 bits, it will be appreciated that the signal CL must therefore at least have 20 bits. Twenty-one bits are used in the preferred embodiment. For the reasons as stated above in connection with the signals A and B, in the preferred embodiment the signal C is provided as 32 bits. Consistent with the discussion above in connection with the other fixed-to-log converter blocks 131, 132, the floating point mantissa output CM is 16 bits and the floating point exponent output CLI will be 5 bits.

As respects the multiplier 100c, a 24 bit fractional representation is used to represent c1 and c2. It is possible in the worst case that C will be totally represented by the constant c3, so that c3 must be able to represent the maximum range. Thus, in the preferred embodiment, c3 is represented by a 3 bit integer and a 29 bit fraction, for a total of 32 bits for C.

The SKY signal is formed by a shift matrix included within the sky generator 110. This shift matrix performs a denormalizing of the mantissa of C, which is effectuated by shifting it. For each binary place that the mantissa is shifted right, an additional significant bit behind the binary point is added. The worst case occurs when the normalizing factor NORM+CLI is zero, resulting in no shift. To preserve precision, in the preferred embodiment a 16 bit fraction is used to represent CM, the mantissa of C for the sky generator, and the shift matrix employed in the sky generator 110 is a 16 by 16 right funnel shifter.

6.5 MULTIPLEXED ANALOG COMPONENT ENCODING

The encoding of video signals on disc 41 and the decoding operation of multiplexed analog components (MAC) demodulator 66 will be discussed in connection with FIGS. 11A through 12B. The preferred embodiment of the present invention employs a novel multiplexed analog component storage arrangement for the keypoint data stored on disc 41.

As will be known to those skilled in the art, a multiplexed analog component scheme for storing and/or transmitting television video signals is one for which the analog color component signals are operated upon and time division multiplexed to give some advantage over direct transmission and/or storage of a standard NTSC composite video signal. Various MAC schemes are known in the prior art. As best as is known to the inventors, all multiplexed analog component schemes currently in use, most of which are used in satellite transmission of television signals, produce one standard composite video line within the standard time for transmission of a single line. Inasmuch as the present invention involves stored video signals on a medium specifically adapted to store standard NTSC encoded composite video signals (video disc 41 in FIG. 10), the present invention allows advantageous use of a non-real-time multiplexed analog component signalling scheme.

Before describing the particular MAC signals employed in the preferred embodiment, a brief discussion of MAC signalling in general will be presented. FIG. 11A qualitatively represents a typical power spectrum of the luminance signal of a composite NTSC signal at 120. The bandwidth provided for the NTSC color subcarrier at 3.58 MHz is shown graphically at 121. In the example of FIG. 11A the NTSC luminance signal has a bandwidth of a and the bandwidth of the chroma signals modulated onto the 3.58 MHz color subcarrier is b; these two signals can overlap. Line 122 qualitatively represents the signal channel noise due to well known phenomenon that an FM transmission channel noise increases as a linear function of log frequency. Therefore, as is well known to those skilled in the art, information contained in a signal of a particular bandwidth is subject to a worse signal-to-noise ratio if it is modulated onto a subcarrier than if it is transmitted in the baseband. Overcoming this phenomenon is one of the fundamental rationales of adoption of multiplex analog component signalling arrangements.

FIG. 11B illustrates a qualitative comparison of the power spectrum for baseband transmission of the same signal (shown at 121 in FIG. 11a) using a two-to-one time compression ratio which is used in the preferred embodiment. Note that the luminance spectrum 120' remains unchanged, while there are major differences in the chrominance channel 123 as a result of use of the MAC scheme. As can be seen in FIG. 11B, the chrominance channel bandwidth has doubled from b to 2b, but occurs at the baseband of the power spectrum where noise is considerably less. Thus, the overall noise ratio for the same signal for the same FM channel is substantively improved.

An explanation of how the foregoing improvement in signal-to-noise ratio is effectuated is best done by explanation in the time domain. Turning next to FIGS. 12A through 12D, the particular MAC scheme of the preferred embodiment will now be described. FIG. 12A generally represents the output of a standard NTSC composite video signal which would be stored in a typical prior art video disc 41 (FIG. 10). As is known to those skilled in the art, a composite video signal containing information for providing I, Q, and Y signals for one scan line n is stored between successive occurrences of horizontal synchronization pulses shown at 124. FIG. 12B represents two successive stored lines of the signal stored on video disc 41. In the MAC scheme, a first complete line of luminance (Y) information is stored in the space and time allotted for one scan line n. In the next scan line n+1 on the video disc, two-to-one time compressed color component signals U and K are stored, and provided upon playback (these U and K color signals are not related to the (u,v) coordinates of the screen). In the preferred embodiment, the first half scan line time of line n+1 of this signal stores a two-to-one compressed representation of the video color signal U, and the second half of scan line time n+1 stores a two-to-one time compressed representation of video signal K. This pattern repeats itself throughout the active picture area of the video disc 41.

In the preferred embodiment, signals U, K, and Y are all linear functions of original red, green, and blue (RGB) signals used in creating the original video image. These are generally given by the following equations:

$$U = r_1 R + s_1 G + t_1 B \quad \text{(Equation 26)}$$

$$K = r_2 R + s_2 G + t_2 B \quad \text{(Equation 27)}$$

$$Y = r_3 R + s_3 G + t_3 B$$

where $r_1, r_2 \ldots t_3$ are constant coefficients. (Equation 28)

As may be seen from Equations 26 through 28, video component signals U, K, and Y in the preferred embodiment are similar to video signals I, Q, and Y used in NTSC format. In the preferred embodiment luminance signal Y is identical to luminance signal Y used in NTSC. While color component signals U and K are not identical to the NTSC color component signals I and Q, they are still linear functions of RGB signals which may be encoded by using a matrix multiply between the RGB signal source and the output of the device generating the U and K signals.

From a brief examination of FIGS. 12B and 11B it will be appreciated that every other horizontal scan line stored on video disc 41 contains a two-to-one time compressed baseband representation of color component signals U and K which occupies band width 2b illustrated in FIG. 11B. This provides a significant improvement in signal-to-noise ratio for the color signals used in the preferred embodiment.

FIG. 12C is a graphic representation of the storage arrangement on video disc 41 when the keypoint data signals illustrated in FIG. 12B occur. Video luminance signals Y1 and Y2 are referenced by 125 and compressed color signals U1 and K1 are shown as 126. The two components of color signals 126 are two-to-one time compressed signals U and K. For example, in FIG. 12c color line c1 is made up of two-to-one time compressed U component U1, and two-to-one time compressed K component K1. Color line c1 is followed by luminance line Y2, which in turn is followed by color line c2. This pattern repeats itself throughout video disc 41 in the preferred embodiment.

It should be noted from the foregoing that the preferred embodiment requires twice the video disc storage to store an equivalent number of output color lines when compared to video disc storing the standard NTSC composite signals. However, the inventors of the present invention have discovered that significant improvements in the color output signals for image storage purposes are obtained from the baseband storage of the color component signals described hereinabove.

Next, a brief description of the operation of MAC demodulator 66 is provided. Upon playback MAC demodulator 66 must first store a digitized representation of a luminance scan line for example, line Y1 of FIG. 12C. Upon receipt of the next line from video disc player 42, the first half of the line is expanded on a two-to-one ratio to provide information for a complete scan line of U signal U1. The second half of scan line C1 is likewise expanded to provide information for a complete scan line of the V color component signal.

Therefore, upon receipt of two lines of signals (such as illustrated in FIG. 12) from video disc player 42, MAC demodulator 66 is storing information necessary to provide a complete scan line for luminance signal Y and color component signals U and K. These are output to the keypoint data memory 70 (FIG. 10) as three eight-bit wide signals representing luminance scan line Y and color information U and K.

The advantages of the novel MAC scheme in the preferred embodiment over direct storage of NTSC composite video on video disc 41 may be summarized as follows. First, the significant improvement in signal-to-noise ratio for the color information, discussed hereinabove, is provided. Secondly, baseband storage of color component signals U and K effectively eliminates hue distortion from time base error in the video signal transmission path. Baseband storage of the color component signals eliminates this problem. Thirdly, the above described MAC arrangement provides for an increase in video bandwidth for the color information signals.

Turning next to FIG. 12D, an alternate embodiment of the MAC signal stored in the processing scheme of the present invention is shown. Those skilled in the art will note that in the above-described MAC encoding method, the sampling bandwidth in the vertical direction is the same for Y, U, and K, while the sampling bandwidth in the horizontal direction for Y is twice that for U and K. However, it has been discovered that because of the sensitivity of the human eye to detail carried by the luminance signal, the sampling bandwidth can be reduced in the vertical as well as the horizontal direction. Accordingly, in the alternate embodiment of FIG. 12D, the sampling bandwidth in the vertical direction is halved over that shown in the first MAC embodiment so that the bandwidths for Y, U, and K are more closely matched in both the vertical and horizontal directions.

In FIG. 12D, luminance lines 125 and color lines 126 are as shown in FIG. 12C. The basic difference between the first described embodiment and the alternate embodiment is how the color information is stored and reproduced by MAC demodulator 66. In the embodiment described in connection with FIG. 12D, two luminance lines are stored for each color line on video disc 41. In this embodiment, the "missing" color lines are created by MAC demodulator 66 as algebraic combinations of adjacent color lines. It is believed that the tradeoffs between use of the preferred embodiment and the alternate embodiment will be apparent to those skilled in the art. The storage scheme illustrated in FIG. 12D shows that information necessary to reproduce two output video scan lines is stored in the storage space provided for three scan lines on the video disc 41. Thus, the expansion of storage space on video disc 41 (over that required for direct storage of NTSC signals) is three-to-two rather than two-to-one as in the embodiment described in connection with FIG. 12C. Thus, the required increase in video disc storage is cut in half with respect to the first-described embodiment.

In exchange for this improvement, the complexity of MAC demodulator 66 must be slightly increased because of the additional storage requirements for storing two of the color lines in order to reproduce the "missing" color information signals.

The operation of the alternate embodiment of MAC demodulator 66 will now be described briefly in connection with FIG. 12D. Assume that color information line C01 is stored in MAC demodulator 66. The demodulator receives luminance line Y1 from the video disc player 42 (FIG. 10). The next line signal received from the disc player is that for luminance signal Y2. This in turn must also be stored. The next received signal is color line C23. Color information for a "missing line" C12, shown in phantom at 127 in FIG. 12D is provided in this embodiment by averaging the information in color lines C01 and C23. In particular, a weighted average for the U and K signals are each obtained and provided as outputs. Thus, the first disc signals occurring in this embodiment will have a luminance component Y1 and color components shown by C12, which were generated from stored color component line C01 and C23.

The next output from demodulator 66 is a video signal generated by combining luminance line Y2 and color line C23. In the meantime, MAC demodulator 66 and video disc player 42 have continued to operate to store luminance line Y4 and color line C45 in demodulator 66.

When the demodulator has completed receiving of the video signal employing luminance line Y2, it commences with transmission of a signal using luminance line Y3 and a "missing color line" C34 which is created as an algebraic combination of stored color lines C23 and C45. When this is completed, the next output line is created using information from luminance signal Y4 and color C45.

The preferred embodiment of the present invention has been disclosed by way of example, and it will be understood that other modifications may occur to those skilled in the art without departing from the scope and the spirit of the appended claims.

What is claimed is:

1. A method of generating an image to simulate a view seen by an observer within an imaginary space, comprising the steps of:
   (1) mapping at least a portion of a panoramic view of a first surface to be simulated in the imaginary space onto a second mapping surface by providing as picture elements the picture values of areas of said mapping surface corresponding to areas of said first surface projected onto said mapping surface;
   (2) storing said picture elements on a storage medium as a panoramic image;
   (3) retrieving from said storage medium a portion of said picture elements as a function of the position and orientation of an observer with respect to the imaginary space; and
   (4) displaying said plurality of picture element on a display.

2. The method of claim 1, further comprising the steps of retrieving from said storage medium a plurality of sky picture elements associated with regions of the panoramic image corresponding to the sky when the observer's position and attitude indicate that the field of view of the observer includes regions above the horizon of the panoramic image, and displaying said sky picture elements.

3. The method of claim 1, wherein said each of said panoramic images comprises a plurality of picture elements mapped in a predetermined geometric projection.

4. The method of claim 3, wherein said predetermined geometric projection comprises a conic projection.

5. The method of claim 4, wherein said conic projection is an inverted conic surface, and wherein the uppermost limit of the conic surface is associated with the boundary between the sky and the horizon in said panoramic image.

6. The method of claim 1, wherein said plurality of picture elements retrieved in said retrieving step comprises a predetermined number N of picture elements, and further comprising the step of sampling said predetermined number N of picture elements to obtain a second predetermined number n of picture elements for display in the displaying step, as a function of observer position and attitude within the imaginary space.

7. The method of claim 1, wherein said panoramic image comprises all data required to reconstruct all possible views of an imaginary landscape within the imaginary space.

8. The method of claim 1, wherein the step of storing on said storage medium comprises storing a plurality of panoramic images, each of said panoramic images being associated with a different predetermined region in said imaginary space, and further comprising the step of selecting one of said plurality of said panoramic images as a function of observer position and attitude within the imaginary space.

9. The method of claim 8, wherein the step of selecting a particular one of said panoramic images comprises selecting one of the image which is closer to the region of the imaginary space in the field of view of the observer.

10. The method of claim 1, wherein said plurality of displayed picture elements are displayed on a CRT.

11. The method of claim 1, wherein the field of view of the observer is a field of view, and further comprising the step of retrieving from said storage medium a second plurality of said picture elements associated with a second field of view of the observer within the imaginary space to stimulate movement from a first point of view of the observer to a second point of view.

12. The method of claim 1, wherein said picture elements of said panoramic image are stored on said storage medium in addressable locations at addresses corresponding to the coordinates of said mapping surface.

13. The method of claim 1, wherein said panoramic image comprises a 360 degree panoramic view.

14. The method of claim 1, wherein said panoramic image comprises a less than 360 degree view.

15. The method of claim 1, wherein said second mapping surface comprises an inverted conic surface.

16. The method of claim 15, wherein the inverted conic surface comprises a plurality of circular horizontal sections, each of said sections being associated with a predetermined number of picture element locations, and wherein the uppermost one of said sections comprises picture elements associated with the horizon of the panoramic image.

17. A system for displaying video images for simulating movement within an imaginary space, comprising:
mass data storage means for storing a plurality of sets of keypoint image data corresponding to a plurality of panoramic views within said imaginary space, said keypoint image data comprising a plurality of picture elements obtained from mapping at least a portion of a panoramic view of a first surface to be simulated in said imaginary space onto a second mapping surface, said picture elements comprising the picture values of areas of said mapping surface corresponding to areas of said first surface projected onto said mapping surface;

means for selecting a particular one of said keypoint data sets store in said mass storage means as a function of input observer position signals;
addressable memory means for storing data corresponding to a selected one of said keypoint data sets selected by said selecting means;
means for generating addresses for said addressable memory means corresponding to said observer position signals and input observer spatial orientation signals;
means for retrieving a selected plurality of picture elements from said addressable memory means from addresses provided by said address generating means; and
means for displaying said selected plurality of picture to provide a video image.

18. Image reproducing apparatus for generating images to simulate movement within an imaginary space, comprising:
image storage means for retrievably storing panoramic image data, said panoramic image data comprising a plurality of picture elements obtained from mapping at least a portion of panoramic view of a first surface to be simulated in said imaginary space onto a second mapping surface, said picture elements comprising the picture values of area: of said mapping surface corresponding to areas of said first surface projected onto said mapping surface;
means for sampling a particular portion of said stored panoramic image data corresponding to an observer field of view with respect to said imaginary space to select a plurality of picture elements; and
means for displaying said selected plurality of picture elements.

19. The apparatus of claim 18, further comprising means for providing position signals corresponding to the position and attitude of said observer field of view with respect to said imaginary space, and wherein said sampling means is responsive to said position signals to select said plurality of picture elements.

20. The apparatus of claim 19, further comprising means for retrieving from said storage means a plurality of sky picture elements associated with regions of said panoramic view corresponding to the sky in response to indication by said position signals that said observer field of view includes regions above the horizon of said panoramic view, and means for displaying said sky picture elements.

21. The apparatus of claim 18, wherein said panoramic view comprises a less than 360 degree view.

22. The apparatus of claim 18, wherein said second mapping surface comprises an inverted conic surface.

23. The apparatus of claim 22, wherein said inverted conic surface comprises a plurality of circular horizontal sections, each of said sections being associated with a predetermined number of picture element locations, and wherein the upper one of said sections comprises picture elements associated with the horizon of said panoramic view.

24. The apparatus of claim 18, wherein said image storage means comprises a video disc.

25. The apparatus of claim 18, wherein said image storage means comprises: a video disc for storing a keypoint data set corresponding said panoramic image data associated with a particular keypoint position in said imaginary space, said keypoint data set comprising a predetermined number N of picture elements, and an addressable memory for storing said N picture elements for accessing by said sample means.

26. The apparatus of claim 25, wherein said sampling means selects from said predetermined number N of picture elements stored in said addressable memory to obtain a second predetermined number n of picture elements for display as a function of observer position and attitude with respect to said imaginary space.

27. The apparatus of claim 25, wherein said video disc stores a plurality of said keypoint data sets, and said addressable memory means stores a particular one of said plurality of keypoint data sets corresponding to said observer field of view.

28. The apparatus of claim 18, wherein said plurality of picture elements stored by said image storage means comprises a predetermined nu N of picture elements, and further comprising addressable memory means for storing said number N of picture elements for accessing by said sampling means, and wherein said sampling means samples said predetermined number N of picture elements to obtain a second predetermined number n of picture elements for display as a function of observer position and attitude with respect to said imaginary space.

29. The apparatus of claim 18, wherein said image storage means stores a plurality of keypoint data sets, each of said keypoint data sets corresponding to a different one of said panoramic views, each of said different panoramic views being associated with a different predetermined region in said imaginary space, and further comprising keypoint selecting means for selecting one of said keyppoint data sets as a function of observer position and attitude with respect to said imaginary space.

30. The apparatus of claim 29, wherein said keypoint selecting means selects one of said keypoint data sets which is closest to the region of the imaginary space in the field of view of the observer.

31. The apparatus of claim 18, wherein said displayed selected plurality of picture elements are displayed on a CRT.

32. The apparatus of claim 18, wherein the field of view of the observer is a first field of view, and wherein said sampling means samples a second particular portion of said stored image data corresponding to a second observer field of view to select a second plurality of picture elements to simulate movement from a first point of view of the observer associated with said first field of view to a second point of view associated with said second field of view.

33. The apparatus of claim 18, wherein said panoramic image data are stored in said storage means in addressable locations at addresses corresponding to the coordinates of said mapping surface.

34. The apparatus of claim 18, wherein said panoramic view comprises a 360 degree panoramic view.

35. A method of reproducing a video image to simulate movement within an imaginary space, comprising the steps of:
(1) mapping a panoramic view of the imaginary space onto a first projection surface associated with a keypoint, the keypoint comprising a point of view of a mapping observer of the imaginary space;
(2) storing picture elements at addresses in an addressable memory corresponding to the coordinates of the first projection surface;
(3) determining the intersection of a first ray emanating from the point of view of a viewing observer within the imaginary space through a predetermined picture element location on a viewing screen associated with the viewing observer with a second projection surface corresponding to the ground of the imaginary space;
(4) tracing a second ray from the intersection of the first ray with the second projection surface to the keypoint;
(5) determining the address in the addressable memory of a picture elements on the first projection surface as a function of coordinates of the intersection of the second ray with the first projection surface;
(6) retrieving data from the addressable memory corresponding to the determined picture element address;
(7) displaying a picture element derived from said retrieved data as the picture element for the predetermined picture element location on a display corresponding to the viewing screen; and
(8) repeating the above steps (3) through (7) to create an entire viewing screen image for all picture element locations of the viewing screen.

36. The method of claim 35, further comprising the steps of:
(9) mapping a plurality of panoramic views of the imaginary space onto a plurality of first projection surfaces associated with a plurality of keypoints, each of the keypoints comprising a different point of view of the mapping observer of the imaginary space;
(10) storing the plurality of panoramic views in a mass storage device;
(11) providing position signals corresponding to the location and orientation of the point of view of the viewing observer in the imaginary space;
(12) selecting a particular one of the stored plurality of panoramic views as a function of the viewing observer position and orientation signals;
(13) storing picture elements of the selected particular one of the panoramic views at addresses in the addressable memory corresponding to the coordinates of the first projection surface; and
(14) carrying out the above steps (3) through (8) to create an entire viewing screen image for all picture element locations of the viewing screen.

37. The method of claim 35, wherein the first projection surface is a conic projection surface.

38. The method of claim 35, wherein the second projection surface corresponds to the ground in the imaginary space.

39. The method of claim 35 further comprising the step of reducing the occurrence of sampling artifacts in the image displayed in the displaying step.

40. The method of claim 39, wherein the data retrieved in the retrieving step comprises a selected subset of a predetermined number m of picture elements, and wherein the step of reducing the occurrence of sampling artifacts in the image displayed comprises filtering said predetermined number m of picture elements to be obtain each one of the picture elements displayed in the displaying step.

41. The method of claim 40, where m is at least four.

42. The method of claim 40, wherein the step of filtering comprises the step of computing a resultant picture element R as a function of the values of the m picture elements.

43. A method of reproducing a series of video images to simulate movement within an imaginary space, comprising the steps of:
(1) creating a database comprising a plurality of panoramic images, each of the images comprising a plurality of picture elements, each of the images being associated with a predefined keypoint region and set of orientations of an observer within said imaginary space, each of the images including picture elements corresponding to all visible picture elements within a field of view of the observer positioned within a predefined subspace and set of observer orientations within said imaginary space associated with said keypoint region;
(2) storing the panoramic images on a storage medium;
(3) selecting one of the stored panoramic images as a function of the spatial location and spatial orientation of the observer within the predefined subspace;
(4) retrieving from the storage medium image data corresponding to the selected one of said stored panoramic images;
(5) storing the retrieved image data in an addressable buffer memory;
(6) selecting a plurality of picture elements stored in the buffer memory corresponding to the location and orientation of the observer within the predefined subspace; and
(7) displaying the selected plurality of picture elements on a display.

44. The method of claim 43, further comprising the steps of:
(8) selecting a second ones of the stored panoramic images in the storage medium when the observer changes from the predefined subspace and set of observer orientations to a second subspace and set of observer orientations associated with a second keypoint region in the imaginary space;
(9) retrieving image data corresponding to the second one of the stored panoramic images;
(10) storing the retrieved image data for the second one of the stored panoramic images in the addressable buffer memory;
(11) selecting a plurality of picture elements stored in the buffer memory corresponding to the location and orientation of the observer within the second subspace; and
(12) displaying the selected plurality of picture elements on a display.

45. In an aircraft flight simulator system, a system for displaying images to simulate movement through an imaginary space, comprising:
data storage means for storing a plurality of sets of keypoint data, each of said keypoint data sets comprising a plurality of picture elements corresponding to a panoramic view from a predetermined location within said imaginary space;
means for receiving position signals and attitude signals form a host controller associated with said simulator system corresponding to an imaginary position and attitude within said imaginary space;
control means responsive to said position signals and said attitude signals for computing frame rate constant signals;
second control means responsive to said position signals and said attitude signals for selecting for display one of said plurality of sets of keypoint data associated with said imaginary position and attitude of said simulator within said imaginary space;
addressable memory means for storing data corresponding to said selected one of said plurality of sets of keypoint data;
keypoint address generator means responsive to said frame rate constant signals for generating addresses for said addressable memory means corresponding to a selected subset of said picture elements of said selected one of said plurality of sets of keypoint data stored in said addressable memory, said selected subset of said picture elements corresponding to particular ones of said picture elements visible to an observer in said simulator system positioned at said imaginary position and attitude within said imaginary space;
means for retrieving said selected subset of said picture elements form said addressable memory means from said addresses provided by said keypoint address generator means; and
means for displaying said selected subset of said picture elements to provide an image corresponding to the view visible to the observer in said simulator positioned at said imaginary position and attitude within said imaginary space.

46. The system of claim 45, wherein said data storage means memory comprises a video disc.

47. The system of claim 46, further comprising means for storing said keypoint data on said videodisc to maximize the signal-to-noise ratio.

48. The system of claim 47, wherein said storing means comprises a multiplexed analog component coder/decoder.

49. The system of claim 45 wherein said keypoint data comprises signals corresponding to color component video signals, and further comprising means for storing said signals in a predetermined storage format on said data storage means so as to maximize the signal-to-noise ratio.

50. The system of claim 49, wherein said predetermined storage format comprises a multiplexed analog component format.

51. The system of claim 45, further comprising antialiasing means for reducing the occurrence of sampling artifacts in said image displayed by said displaying means.

52. The system of claim 51, wherein said selected subset of said picture elements displayed by said displaying means comprises a predetermined number n of displayed picture elements, and wherein said antialiasing means comprises:
means for retrieving a predetermined number m of said picture elements from said addressable memory means for each one of said n displayed picture elements; and
means for filtering said predetermined number m of said picture elements to obtain each one of said n displayed picture elements.

53. The system of claim 52, where m is at least four.

54. The system of claim 52, wherein said filtering means is responsive to compute a resultant picture element R as a function of the values of said m picture elements.

55. The system of claim 51, wherein said addresses generated by said keypoint address generator means comprises an integer portion and a fractional portion, and wherein said antialiasing means comprises:

means responsive to said integer portion for retrieving a predetermined number m of pictures elements;

filter means responsive to said fractional portion for computing a resultant picture element R as a function of the values of said m picture elements.

56. The system of claim 55, wherein said filter means comprises a finite impulse response filter.

57. The system of claim 55, wherein m is at least four.

58. The system of claim 45 further comprising means for generating a haze overlay on a video image displayed by said display means to simulate haze conditions.

59. The system of claim 58, wherein said haze overlay generating means is selectable as to haze color.

60. The system of claim 59, wherein said haze overlay generating means is selectable as to haze intensity.

61. The system of claim 58, wherein said haze overlay generating means is responsive to an angle-to-horizon signal corresponding to the angle to the imaginary horizon of a point on said image displayed by said displaying means.

62. The system of claim 61, wherein said angle-to-horizon signal is F and has the form:

F=F1 * u+f2 * v+f3 where f1, f2, and f3 are frame rate constants, u is a horizontal pixel rate variable, and v is a vertical line rate variable.

63. The system of claim 44, wherein each one of said addresses for said addressable memory means generated by said keypoint address generator means comprises a first address portion corresponding to an azimuthal spatial coordinate in said imaginary space and a second address portion corresponding to an elevational spatial coordinate in said imaginary space.

64. The system of claim 63, wherein said second address portion includes a terrain address portion and a sky address portion, and wherein said sky address portion corresponds to data stored in said addressable memory means for generating a sky region of said imaginary space in said video image displayed to the observer.

65. The system of claim 64, further comprising sky address generator means responsive to said position signals and said attitude signals for generating said sky address portion when the picture elements visible to said observer in said simulator correspond to regions of sky in said imaginary space.

66. The system of claim 63, wherein said first address portion corresponds to a horizontal spatial coordinate of a geometric projection of a predefined region of said imaginary space, and said second address portion corresponds to a vertical spatial coordinate of said geometric projection of said predefined region of said imaginary space.

67. The system of claim 45, wherein said frame rate constant signals have the form:

A=a1 * u+a2 * v+a3
B=b1 * u+b2 * v+b3
C=c1 * u+C2 * v+c3 where a1, a2, a3, b1, b2, b3, c1, c2, and c3 are frame rate constants, u is a horizontal pixel rate variable, and v is a vertical line rate variable.

68. The system of claim 67, further comprising row/column multiplier means responsive to said frame rate constants for calculating the equations for A, B, and C at pixel rates.

69. The system of claim 45, wherein said addressable memory means comprises a double buffered random access memory.

70. In a visual system for a vehicle simulator, said visual system generating a plurality of output images to simulate an imaginary space, a system for generating a haze overlay for said images to simulate variable visibility conditions, comprising:

means for providing distance signals corresponding to the distance from an observer in the simulator to a point in the imaginary space;

means responsive to said distance signals for computing a haze factor corresponding to the degree of haze to be imposed upon said images; and output means responsive to said haze factor and input signals representing said images for providing output signals corresponding to said images overlaid with haze.

71. The system of claim 70, further comprising means for providing a haze color signal corresponding to a desired color of haze for said images, and wherein said output means is responsive to provide said output signals as a weighted average between said haze color signal and the brightness value of each picture element of said images as a function of said haze factor.

72. The system of claim 70, wherein said haze factor computing means comprises:

means for providing an angle-to-horizon signal corresponding to the angle to the imaginary horizon of a point on the output image, and means responsive to said angle-to-horizon signal for computing said haze factor.

73. The system of claim 72, wherein said angle-to-horizon signal is F and has the form:

F=f1 * u+f2 * v+f3 where f1, f2, and f3 are frame rate constants, u is a horizontal pixel rate variable, and v is a vertical line rate variable.

74. The system of claim 70, wherein said haze factor computing means is operative to provide said haze factor at a constant value for all portions of said image which are parallel to a horizon line in said imaginary space.

75. A method of generating a displayed image to simulate a view seen by an observer moving within an imaginary space, comprising the steps of:

(1) obtaining a panoramic image by mapping at least a portion of a panoramic view of a first surface to be simulated in the imaginary space onto a second mapping surface by providing as picture elements the picture values of areas of said mapping surface corresponding to areas of said first surface projected onto said mapping surface;

(2) storing said panoramic image on a storage medium;

(3) retrieving from said storage medium portions of said panoramic image associated with the point of view of an observer within the imaginary space; and (4) displaying on a display a plurality of displayed picture elements formed from spatial modification of said retrieved portions of said panoramic image.

76. The method of claim 75, further comprising the steps of retrieving from said storage medium portions of said panoramic image associated with regions of the panoramic view corresponding to the sky when the observer's position and attitude indicate that the field of view of the observer includes regions of the sky of the panoramic view, and displaying a plurality of picture element formed from said retrieved sky portions of said panoramic image.

77. The method of claim 75, wherein said mapping surface comprises a cone.

78. The method of claim 77, wherein said cone is a inverted conic surface, and wherein the uppermost limit of the conic surface is associated with the boundary between the sky and the horizon in said panoramic image.

79. The method of claim 75, wherein said panoramic image comprises a predetermined number N of stored picture elements, and wherein the step of retrieving portions of said panoramic image comprises the step of sampling said predetermined number N of stored picture elements to obtain a second predetermined number n of sampled picture elements for use in the displaying step, as a function of observer position and attitude with respect to the imaginary space.

80. The method of claim 75, wherein said panoramic image comprises all data required to reconstruct all possible views of an imaginary landscape within the imaginary space.

81. The method of claim 75, wherein the step of storing on said storage medium comprises storing a plurality of panoramic images, each of said panoramic images being associated with a different predetermined keypoint position in said imaginary space, and further comprising the step of selecting one of said plurality of said panoramic images as a function of observer position and attitude with respect to the imaginary space.

82. The method of claim 81, wherein the step of selecting one of said panoramic images comprises selecting said image as a function of observer position and attitude relative to said predetermined keypoint position.

83. The method of claim 81, wherein the step of selecting one of said panoramic images comprises selecting the image associated with the keypoint which is closest to the region of the imaginary space in the field of view of the observer.

84. The method of claim 75, wherein the displayed picture elements are displayed on a CRT.

85. The method of claim 75, wherein the step of displaying provides a first displayed image, and further comprising the step of retrieving from said storage medium other portions of said panoramic image associated with a second point of view of the observer within the imaginary space to stimulate movement from the first point of view of the observer to the second point of view.

86. A method of generating a video image to simulate movement within an imaginary space, comprising the steps of:
  (1) mapping at least a portion of a panoramic view of a first surface to be simulated in the imaginary space onto a second mapping surface by providing as picture elements the picture values of areas of said mapping surface corresponding to areas of said first surface projected onto said mapping surface, a plurality of picture elements associated with a predetermined keypoint of view in the imaginary space corresponding to a panoramic image;
  (2) storing on a storage medium a plurality of panoramic images, each of said panoramic images being associated with a different one of a plurality of said predetermined keypoints of view within the imaginary space;
  (3) selecting a particular one of said panoramic images stored on said storage medium as a first function of the spatial position and orientation of the field of view of an observer with respect to the imaginary space;
  (4) retrieving said particular one of said panoramic images from said storage medium;
  (5) selecting a particular subset of said plurality of picture elements of said particular retrieved one of said panoramic images as a second function of the spatial position and orientation of the field of view of the observer with respect to the imaginary space; and
  (6) displaying said selected subset of said picture elements on a display.

87. The method of claim 86, wherein each of said plurality of panoramic images is a 360° panoramic image.

88. The method of claim 86, wherein each of said plurality of panoramic images corresponds to a predetermined region in the imaginary space related to the spatial position and orientation of the field of views of the observer.

89. The method of claim 86, wherein said plurality of predetermined keypoints of view within said imaginary space are dispersed in a predetermined pattern throughout the imaginary space.

90. The method of claim 86, wherein said first function comprises a function related to a point on the ground in the imaginary space associated with the bottom of the field of view of the observer.

91. The method of claim 90, wherein said first function comprises the steps of mapping the imaginary ground of the imaginary space to the field of view of the observer;
  determining the closet predetermined keypoint of view to a ground point in the imaginary space at the bottom of the field of view of the observer; and
  selecting the predetermined keypoint of view for use in generating the image which is either (1) the closet predetermined keypoint of view to said ground point in the imaginary space or (2) no more than one keypoint of view away from said ground point in the imaginary space.

* * * * *